US007054835B2

(12) United States Patent
Nanbu et al.

(10) Patent No.: US 7,054,835 B2
(45) Date of Patent: May 30, 2006

(54) ELECTRONIC COMMERCE PROVIDING SYSTEM HAVING ORDERER AUTHENTICATING FUNCTION

(75) Inventors: Kazuhiro Nanbu, Kawasaki (JP); Norio Murakami, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 473 days.

(21) Appl. No.: 09/989,547

(22) Filed: Nov. 20, 2001

(65) Prior Publication Data
US 2003/0018544 A1 Jan. 23, 2003

(30) Foreign Application Priority Data
Jul. 18, 2001 (JP) .............................. 2001-218586

(51) Int. Cl.
*G06F 17/60* (2006.01)
(52) U.S. Cl. ........................ 705/26; 705/67; 705/72; 705/75; 705/76
(58) Field of Classification Search ................. 705/26, 705/27, 67, 72, 75, 76
See application file for complete search history.

(56) References Cited

U.S. PATENT DOCUMENTS

| 6,688,435 | B1* | 2/2004 | Will et al. ................... 186/35 |
| 6,754,636 | B1* | 6/2004 | Walker et al. ................ 705/26 |
| 6,772,130 | B1* | 8/2004 | Karbowski et al. ............ 705/26 |
| 2001/0049636 | A1* | 12/2001 | Hudda et al. ................. 705/26 |
| 2001/0054010 | A1* | 12/2001 | Bernabeo et al. ............. 705/26 |
| 2002/0032613 | A1* | 3/2002 | Buettgenbach et al. ....... 705/26 |
| 2002/0035515 | A1* | 3/2002 | Moreno ........................ 705/26 |
| 2002/0049636 | A1* | 4/2002 | Griffin et al. ................. 705/26 |
| 2002/0069166 | A1* | 6/2002 | Moreau et al. ............... 705/40 |
| 2002/0111837 | A1* | 8/2002 | Aupperle ....................... 705/5 |
| 2002/0116289 | A1* | 8/2002 | Yang ............................ 705/26 |
| 2002/0133415 | A1* | 9/2002 | Zarovinsky ................... 705/26 |
| 2002/0143655 | A1* | 10/2002 | Elston et al. ................. 705/26 |
| 2002/0156645 | A1* | 10/2002 | Hansen .......................... 705/1 |
| 2002/0178074 | A1* | 11/2002 | Bloom ........................ 705/26 |
| 2003/0208411 | A1* | 11/2003 | Estes et al. .................. 705/26 |

FOREIGN PATENT DOCUMENTS

| JP | 0903481 | 2/1997 |
| JP | 11086101 | 3/1999 |

OTHER PUBLICATIONS

Google Groups, Subject: Re: Astoptx Wholesale Optics, Feb. 18, 2000.*
Survey—Japanese Industry: Web spurson on ailing economy The Business to Consumer E-commerce Market, Nusbaum, Alexandra; Financial Times, Nov. 30, 1999.*
Game is first to trial Dropzone1; New Media Age, Nov. 9, 2000.*

* cited by examiner

*Primary Examiner*—Steven B. McAllister
(74) *Attorney, Agent, or Firm*—Katten Muchin Rosenman LLP

(57) ABSTRACT

An electronic commerce server enables an orderer to given an order of purchasing a commercial article at a virtual shop existing on a network by accessing the virtual shop from a communication terminal used by the orderer, and to receive the purchase target article at an agency service trader's place other than the home. This server includes a receiving unit receiving from the virtual shop a piece of order information of the purchase target article and a piece of information for specifying a desired agency service trader's place for receiving the purchase target article, of which respective notifications are given via the communication terminal used by the orderer, an issuing unit issuing a piece of identification information unique to both of every orderer and every purchase target article on the basis of the order information, and a confirmation unit confirming the identification information received by the communication terminal used by the orderer through the agency service trader's place.

22 Claims, 23 Drawing Sheets

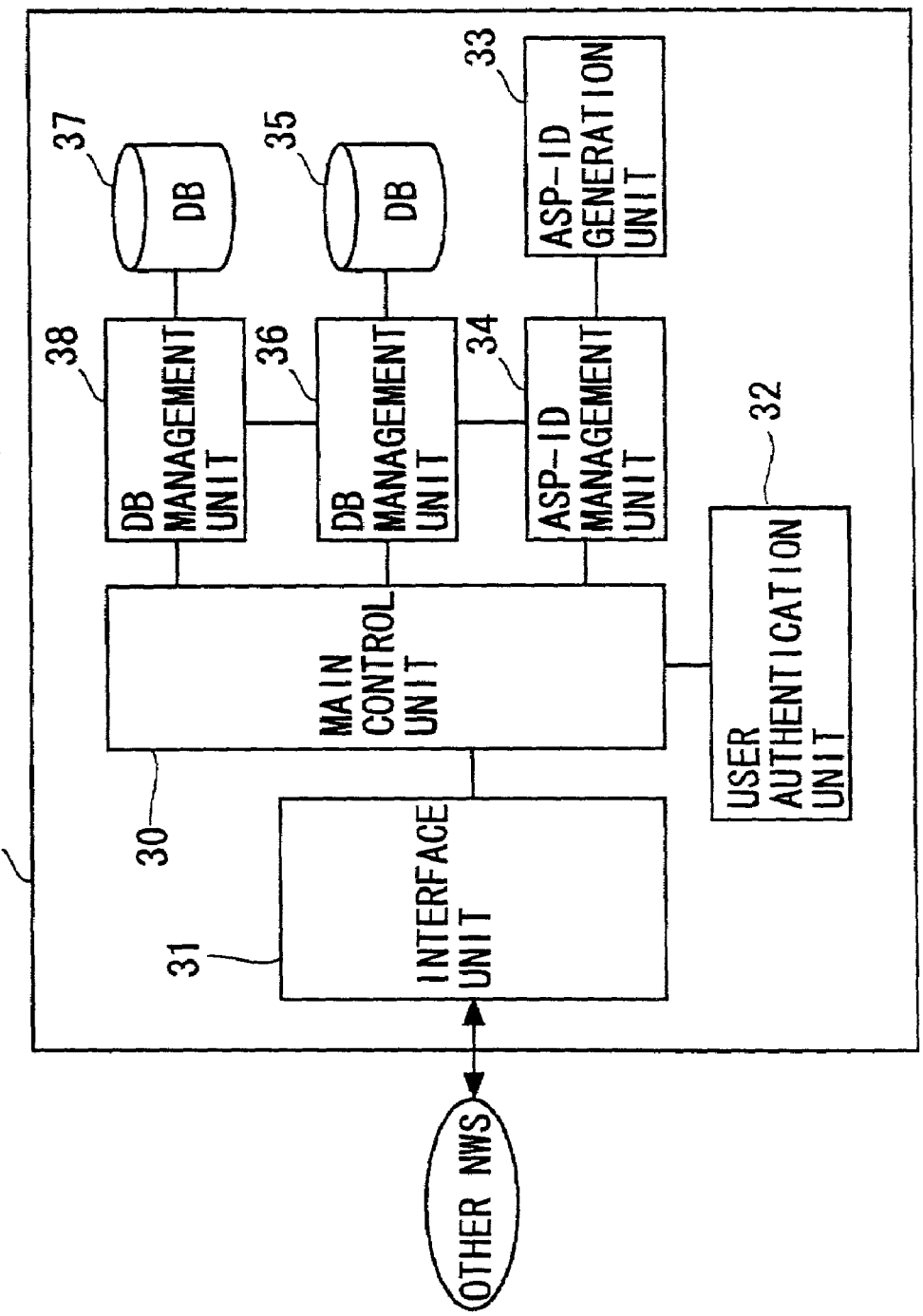

FIG. 3

| NO. | INPUT INFORMATION |
|---|---|
| 1 | PHONE NUMBER (MSN) OF SPECIFIED MOBILE TERMINAL NOTIFYING OF ASP-ID AND RECEIVABLE DATE AND TIME |
| 2 | NAME OF ORDERER |
| 3 | ADDRESS |
| 4 | PHONE NUMBER OF ORDERER |
| 5 | NAME OF ARTICLE AND NUMBER OF ARTICLES |
| 6 | ARTICLE NUMBER (ARTICLE CODE) |
| 7 | SETTLEMENT METHOD (CREDIT NUMBER IN THE CASE OF CREDIT SETTLEMENT. IF PAID AT CONVENIENCE STORE, THIS PAYMENT MODE IS SELECTED) |
| 8 | DELIVERY DESTINATION (SELECTION OF NAME OF CONVENIENCE STORE AND LOCATION) |

FIG. 4

| NO. | KEY PARAMETERS |
|---|---|
| 1 | NAME OF ARTICLE AND NUMBER OF ARTICLES |
| 2 | NAME OF ORDERER |
| 3 | DATE OF ORDER |
| 4 | ADDRESS AND CONTACT INFORMATION |
| 5 | DELIVERY DESTINATION |

FIG. 6

EVER-MANAGED-BY-ASP DATABASE OF EACH BUSINESS PARTNER i) ··· DELIVERY DESTINATION (CONVENIENCE STORE) CODE 371

| CONVENIENCE STORE CODE | NAME OF CONVENIENCE STORE | LOCATION | PHONE NUMBER |
|---|---|---|---|
| XXX | AAAA | XXX | XXX |
| YYY | BBBB | XXX | XXX |
| ZZZ | CCCC | XXX | XXX | ii) ··· SETTLEMENT INSTITUTION CODE 372

| SETTLEMENT INSTITUTION CODE | SETTLEMENT INSTITUTION (NAME OF BRANCH OFFICE OF BANK) | BANK ACCOUNT NUMBER |
|---|---|---|
| XXX | AAAA | XXX |
| YYY | BBBB | XXX |
| ZZZ | CCCC | XXX | iii) ··· HOME DELIVERY SERVICE TRADER CODE 373

| HOME DELIVERY SERVICE TRADER CODE | NAME OF HOME DELIVERY SERVICE TRADER |
|---|---|
| XXX | AAAA |
| YYY | BBBB |
| ZZZ | CCCC |

FIG. 9

| IDENTIFIER | HASH VALUE EXTRACTION RULES |
|---|---|
| 1 | CONSECUTIVE 4 DIGITS FROM FIRST DIGIT |
| 2 | CONSECUTIVE 4 DIGITS FROM FIFTH DIGIT |
| 3 | CONSECUTIVE 4 DIGITS FROM NINTH DIGIT |
| 4 | CONSECUTIVE 4 DIGITS FROM THIRTEENTH DIGIT |
| ⋮ | ⋮ |
| ⋮ | ⋮ |
| ⋮ | ⋮ |
| n | ⋮ |

FIG. 18
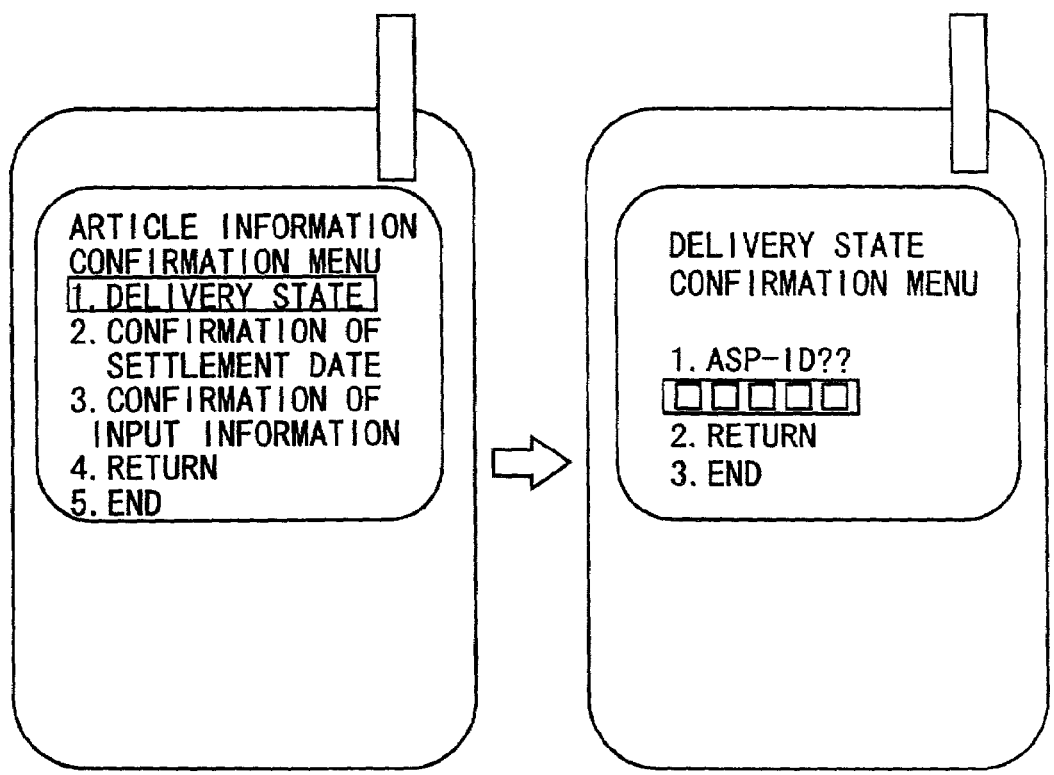
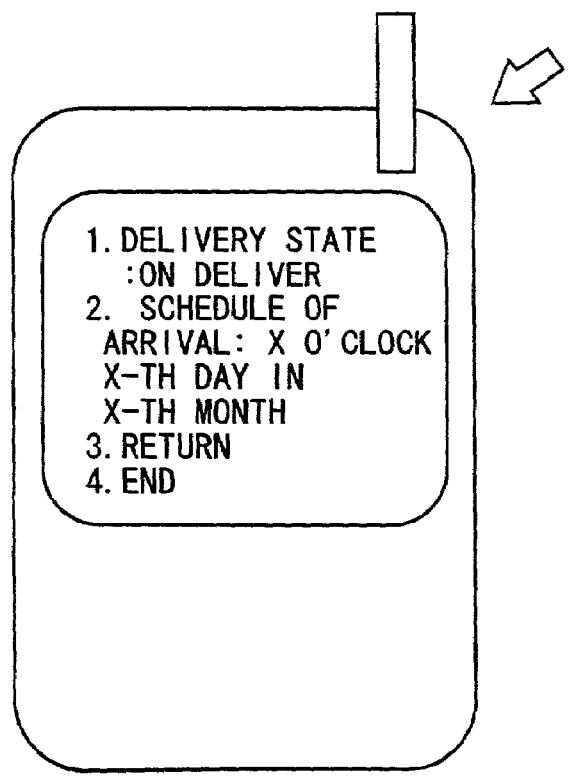

ELECTRONIC COMMERCE PROVIDING SYSTEM HAVING ORDERER AUTHENTICATING FUNCTION

BACKGROUND OF THE INVENTION

The present invention relates generally to an electronic commerce (EC) providing system, and more particularly to an EC providing system having an orderer authenticating function.

With an explosive spread of the Internet evolved, the electronic commerce (EC) on the network-based platform (environment) has been accelerated over the recent years. A multiplicity of virtual shops (EC shops) targeting sales of commercial articles exists as an EC site on the networks in the EC providing system.

In the case of purchasing an article from any one of those EC shops, the purchaser must be in home to receive the purchase target article, and this requirement of being in home may be a barrier to unmarried persons and double-income families.

Obviation of this problem requires a system in which the purchase target article is handed over to the purchaser at a retailer shop such as a convenience store and so on, and a usability of this system rises. This system, however, still have some points unfriendly to the orderer (who may be called a purchaser or consumer).

Normally, when the orderer receives the article purchased from the EC shop at the retailer (agency service trader) shop such as the convenience store etc, the EC shop and the agency service trader need to agree upon a delivery and receipt of the article, an agency service for the hand-over and further a settlement work.

It is in fact impossible that the multiplicity of EC shops existing on the network have the contracts with each of the agency service traders performing the works such as the hand-over of the purchase target articles. Therefore, the orderer is unable to specify an arbitrary desired agency service trader to receive the purchase target article, with the result that the utilizable EC shops are limited. This does not satisfy the demand of the orderer.

Further, when the orderer receives the purchase target article at the shop of the agency service trader, the identity of the orderer is confirmed by showing a sheet of record or the like handed when giving an order of the article, and its credibility still remains imperfect.

Moreover, the EC shop can get a confirmation about a state of the article hand-over to the orderer from a home delivery service trader when delivering the article to the home, however, a problem is that the EC shop is unable to confirm the article hand-over to the orderer if the article is delivered to the agency service trader shop like the convenience store etc. This makes it difficult for the EC shop to decide a time for starting the service such as an after-sales care etc that should be provided to the orderer.

As explained above, the conventional EC providing system is capable of improving the usability to such an extent that the orderer can receive the target article purchased from the EC shop at the agency service trader shop such as the convenience store etc, but has no such contrivance that the orderer can specify a desired agency service trader shop such as a nearby convenience store.

The conventional EC providing system does not include a highly credible system for confirming the orderer when the orderer receives the purchase target article.

Further, the EC shop, unlike the home delivery of the article, needs the in-between agency service trader through which the orderer receives the article, resulting in a time lag of receipt. Therefore, the EC shop inevitably loses a proper timing for providing the after-sales care (customer management) to the customer after purchasing the article.

Moreover, it is difficult for a middle- or small-sized EC shop to provide the orderer with an advantageous service in terms of an economical factor.

Accordingly, prosperity of the EC market cannot be expected in the conventional EC providing system containing these factors that prevent the development of the E-commerce.

SUMMARY OF THE INVENTION

It is a primary object of the present invention, which was devised to obviate the various problems described above, to provide a technique and a method capable of speeding up a development of E-commerce.

It is another object of the present invention to provide a technique and a method capable of authenticating the identity of an orderer (purchaser) by utilizing a communication terminal possessed by the orderer.

It is a further object of the present invention to provide a technique and a method capable of integrating a series of works related to network shopping.

To accomplish these objects, according to one aspect of the present invention, a first electronic commerce server enables an orderer to given an order of purchasing a commercial article at a virtual shop existing on a network by accessing the virtual shop from a communication terminal used by the orderer, and to receive the purchase target article at an agency service trader's place other than the home. The electronic commerce server comprises a receiving unit receiving from the virtual shop a piece of order information of the purchase target article and a piece of information for specifying a desired agency service trader's place for receiving the purchase target article, of which respective notifications are given via the communication terminal used by the orderer, an issuing unit issuing a piece of identification information unique to both of every orderer and every purchase target article on the basis of the order information, and a confirmation unit confirming the identification information received by the communication terminal used by the orderer through the agency service trader's place.

According to a second electronic commerce server, the issuing unit may include a generation unit generating the identification information unique to every orderer and to every purchase target article from a one-way function on the basis of the order information received from the virtual shop.

According to a third electronic commerce server, the generation unit may set the identification information so as to contain numerals of specified digits of a telephone number corresponding to the communication terminal used by the orderer that is contained in the order information.

A fourth electronic commerce server may further comprise a unit notifying the virtual shop of a request for delivering the purchase target article and receiving a home delivery slip number as a response of the delivery of the purchase target article from the virtual shop.

A fifth electronic commerce server may further comprise a unit notifying the communication terminal specified by the orderer of the identification information and a receivable date and time for receiving the purchase target article, and notifying the desired agency service trader's place for receiving the purchase target article, of a name of the orderer, a name of the purchase target article and the home delivery slip number which are contained in the order information.

The present invention is schemed to provide a usability of a life-space of the orderer by adding a new mode for utilizing a mobile communication terminal (such as a mobile phone terminal and a PDA (Personal Digital Assistant and so on). The present invention is also schemed to authenticate the identity of the orderer with a high credibility on the basis of a technology of recognizing an owner of the mobile communication terminal and a piece of orderer authentication information generated by a computer system on the network by preferably utilizing a technology in an IMT-2000 (International Mobile Telecommunication System 2000) as a next generation mobile communication system.

The IMT-2000 system has characteristics of actualizing global services (provided in a variety of utilizing modes and utilizable over the boundaries of areas) and providing multimedia communication services (exhibiting a high affinity with the Internet).

It is a prospective view that Mobile-IP will be introduced into this IMT-2000 system in near future. Further, if IPv6 is introduced, unique IP addresses are allocated too all the mobile communication terminals, and the terminal owners can be recognized without being limited to the telephone numbers of the mobile communication terminals.

Moreover, in the IMT-2000 system, it is compulsory to use UIM (Universal Subscriber Identity Module) as a contact smart card defined as an upper compatibility IC card of a contact smart card SIM (Subscriber Identity Module) adopted in GSM (Global System for Mobile Communications). The subscriber information such as a telephone number and so on is written not to the mobile communication terminal but to the contact smart card UIM.

The contact smart card UIM is connected to (inserted into) the mobile communication terminal, whereby the user can separately use the mobile communication terminal as the user intends. If a credit function is added, the UIM can be used as a substitute for electronic money on the mobile communication terminal, and can be, if recorded with individual information, used as a substitute for ID for identify the individual.

According to the present invention, when buying the commercial article at the EC shop on the network and specifying an agency service trader shop like a convenience store desired by the orderer as a purchase target article receiving place, a computer system on the network for providing the EC services generates a piece of authentication information (orderer authentication identifier) needed for receiving the article from the telephone number or the like of the communication terminal by use of an encryption technology such as a one-way function, and automatically transmits the authentication information to the communication terminal that is daily carried or used by the orderer.

When the orderer confirms a delivery state of the purchase target article on the communication terminal possessed by the orderer, the authentication information is used as a key. The orderer is authenticated by showing the authentication information to a shop worker when receiving the article at the convenience store or by transferring pieces of authentication information accumulated in the communication terminal to a POS terminal of the convenience store. At the same time, the communication terminal or the POS terminal of the convenience store notifies the computer system on the network of a piece of information indicating a receipt of the article.

The computer system notifies the EC shop receiving the order that the receipt of the article by the orderer is finished, and the EC shop can smoothly move to a service stage of providing the orderer with an after-sales care after purchasing the article.

According to the present invention, the identity of the orderer (purchaser) can be authenticated by utilizing the communication terminal possessed by the orderer, and a series of works related to the network shopping can be integrated.

The computer system on the network is connected to business networks of enterprises (such as agency service traders such as the convenience stores, kiosk etc, home delivery service traders, settlement institutions and so forth) related to the EC services, whereby a business for controlling and integrating the information necessary for a series of business transactions relative to the orderer's purchasing the article on the network.

According to the present invention, the computer system embraces and actualizes commerce procedures and a credit guaranty needed per enterprise, whereby new economic values can be created on the network.

BRIEF DESCRIPTION OF THE DRAWINGS

The foregoing and other features and advantages of the present invention will become more readily appreciated as the same becomes better understood by reference to the following detailed description when taken into conjunction with the accompanying drawings wherein:

FIG. 2 is a block diagram showing a detailed architecture of a computer system (ASP);

FIG. 3 is a diagram showing one example of input information given from an orderer;

FIG. 4 is a diagram showing one example of key parameters when an EC shop refers to the information;

FIG. 6 is a diagram showing an example of a structure of a database;

FIG. 9 is a diagram showing a mapping of the identifiers to Hash value extraction rules;

FIG. 18 is a diagram showing an image of a menu screen when performing an operation such as confirming the delivery of the article on the mobile terminal;

DETAILED DESCRIPTION OF THE PREFERRED EMBODIMENTS

Next, preferred embodiments of the present invention will hereinafter be described with reference to the accompanying drawings.

[Architecture of Electronic Commerce Providing System]

Figure 1:
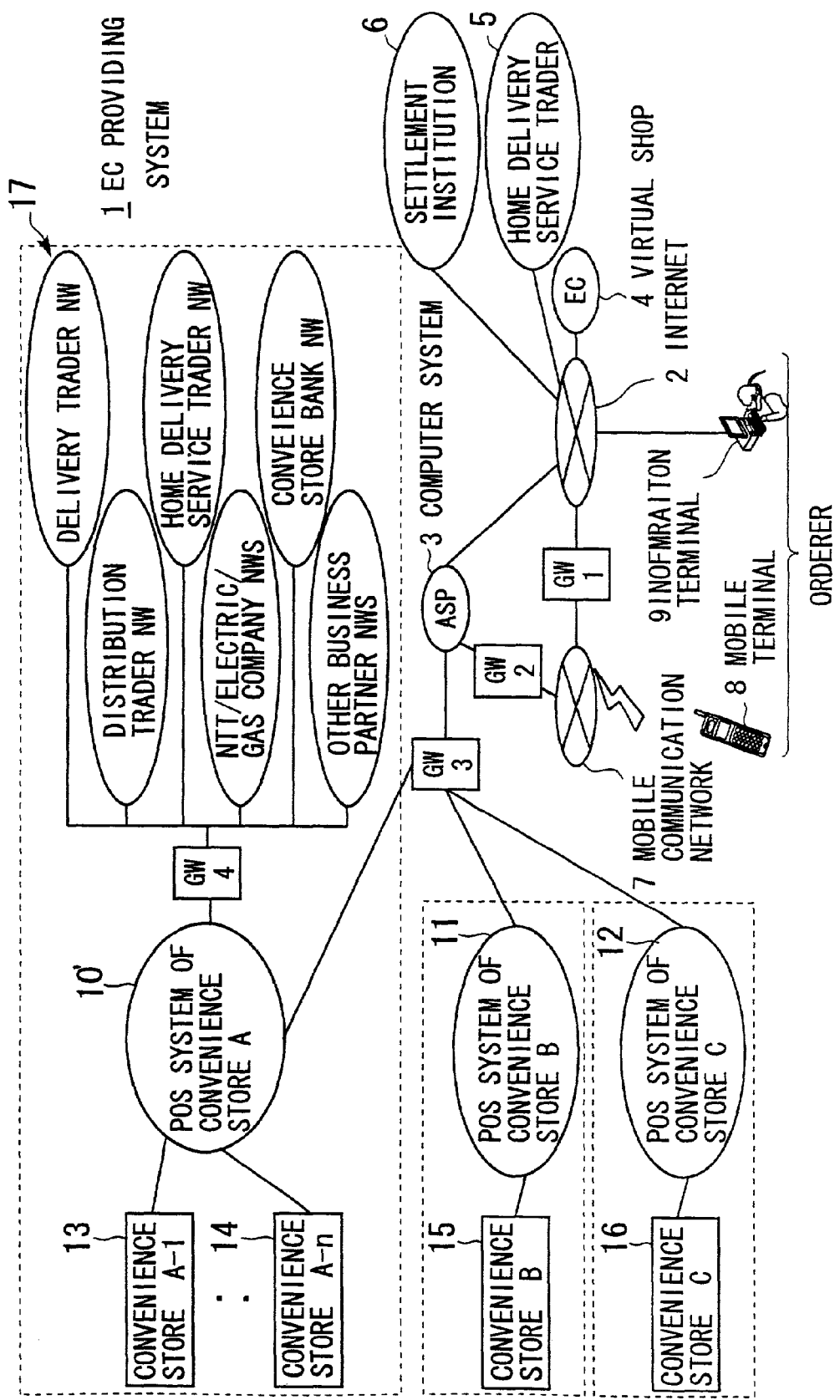
FIG. 1 is a block diagram showing an architecture of an electronic commerce (EC) providing system in one embodiment of the present invention.

FIG. 1 shows an architecture of an electronic commerce (EC) providing system in one embodiment of the present invention. referring to FIG. 1, an EC providing system 1 includes an Internet 2 categorized as an IP (Internet Protocol) communication network.

The Internet 2 accommodates a computer system 3 for controlling how EC services are to be provided, a virtual shop (an EC shop) 4, a home delivery service company 5 such as a transport company, and a settlement institution 6 including a bank and a settlement agent.

The computer system 3 is defined as an agent (dealing agent) server possessed by an ASP (Application Service Provider) and, as will be explained later on, takes an architecture shown in FIG. 2. This embodiment takes a form in which the computer system 3 is accommodated directly in the Internet 2 but may also be accommodated in an individual network and connected to the Internet 2 via a gateway.

The EC shop 4, the home delivery service company 5 and the settlement institution 6 act as business partners in EC services together with a convenience store that will be described later on. Each of the EC shop 4, the home delivery service company 5 and the settlement institution 6 is defined as strictly at least one server computer accommodated in the Internet 2.

The present EC providing system 1 further includes a mobile communication network 7. The mobile communication network 7 is connected to the Internet 2 and the computer system 3 via gateways GW1, GW2 each incorporating a protocol converting function. Herein, the mobile communication network 7 is illustrated as a single communication network but is actually configured by a plurality of mobile communication networks administered respectively by a plurality of mobile common carriers. Further, if a CATV (Cable Television) transmission network is utilized for the communications, the mobile communication network 7 is related (linked) to the CATV network.

The mobile communication network 7 accommodates a mobile terminal (communication terminal) 8 serving as a subscriber terminal. The mobile terminal 8 may be, if provided with a communication function with the computer system 3, an information display function and an information specifying function, one of a single unit or a composite unit of an i-mode, EZweb or J-sky mobile phone and a PDA (Personal Digital Assistant).

Namely, the mobile terminal 8 is required to be a mobile communication terminal capable of readily receiving from the computer system 3 an orderer authentication identifier (ASP-ID) when an orderer (purchaser) receives a purchase target commercial article, and showing the orderer authentication identifier to an article receiving place (which is herein the convenience store).

As will be explained in depth, according to the present invention, a contact smart card (UIM, SIM cards) or a contact-less smart card is utilized as a memory card (IC card), whereby the orderer can receive the purchase target article at the article receiving place as from an agency service trader.

In the case of taking the orderer authentication mode based on the memory card as described above, an L-mode oriented fixed telephone terminal or a communication terminal like a personal computer as an information terminal, may substitute for the mobile terminal 8. When utilizing one of these communication terminals as a substitute for the mobile terminal 8, a corresponding common carrier network such as the fixed telephone network or the CATV network becomes an in-between network.

The Internet 2 accommodates an information terminal 9 like the personal computer as the communication terminal. The L-mode oriented fixed telephone terminal may also be used as this information terminal 9. Required functions that the information terminal 9 has, are a content (information) specifying function and a content display function on a target EC site (Website), and a communication function with the computer system 3.

The mobile terminal 8 and the information terminal 9 are the communication terminals enabling the orderer to purchase the commercial article. Accordingly, each of these communication terminals incorporates a function capable of accessing various categories of information existing on the Internet 2 directly or via the corresponding common carrier network and browsing the information and receiving the streaming (audio/video) data, and a function capable of performing communications of necessary items of information with the computer system 3 having a variety of purposes for managing the information.

In this EC providing system 1, first, second and third agency service trader networks 10, 11, 12 are connected to the computer system 3 via a gateway G3 having the protocol converting function.

The first agency service trader network (convenience store A/POS (Point of Sales) system) 10 accommodates a plurality of convenience stores (convenience stores A) 13, 14 as agency service traders. The second agency service trader network (convenience store B/POS system) 11 accommodates a convenience store (convenience store B) 15 as an agency service trader.

Further, the third agency service trader network (convenience store C/POS system) 12 accommodates a convenience store (convenience store C) 16 as an agency service trader. Each of the convenience stores 13, 14, 15, 16 has a POS terminal.

A variety of existing networks 17 for a delivery trader, a distribution trader and a home delivery trader, are connected to the first large-scale agency service trader network accommodating the plurality of convenience stores 13, 14 via a gateway GW4 having a firewall function, thereby providing consumers with a variety of normal services.

The EC providing system 1 described above is configured in a wide area network consisting of the networks 7, 2 for connecting the mobile terminal 8 and the information terminal 9, the network for a settlement service occurred with purchasing the commercial article and for a physical distribution service such as delivering and so on, and a service network for a retailer who provides the orderer with the receiving place for receiving the purchase target article and for the distribution trader.

In this EC providing system 1, when the order purchases a commercial article through the mobile terminal 9 and the information terminal 9 capable of purchasing the article from the EC shop existing on the Internet 2, the purchaser receives the purchase target article by network (online) shopping in a place other than the home, an orderer identity can be authenticated by utilizing the mobile terminal 8 or the like. This EC providing system 1 is thus capable of providing the EC services schemed to integrate a series of services (operations) related to the network shopping, and therefore includes the computer system 3 that will hereinafter be explained.

[Computer System (ASP Server)]

The computer system 3 for controlling how the EC services are provided is classified as an ASP server possessed by ASP. The computer system 3 is, as its detailed architecture is shown in FIG. 2, constructed of a main control unit 30, an interface unit (communication control unit) 31, a user authentication unit 32, an ASP-ID generation unit 33, an ASP-ID management unit 34, a database (DB) 35, a database management unit 36, a database 37 and a database management unit 38.

The main control unit 30 distributes the information to the respective functional units of the computer system 3, and controlling and administering the respective functional units. The interface unit 31 makes the computer system 3 connectable to other networks. Further, the interface unit 31 notifies the purchaser's mobile terminal or information terminal 9 of the ASP-ID in order to display and record the ASP-ID thereon.

The user authentication unit 32 collates the orderer authentication identifier (ASP-ID) of which the POS terminal at the convenience store as the agency service trader notifies the computer system 3 in order to authenticate the identity of the orderer (user authentication) when receiving the purchase target article.

The ASP-ID generation unit 33, after completing a purchase target article delivery process, generates the ASP-ID as a unique management number used for the user authentication by use of a Hash function defined as a one-way function from the information such as a telephone number (mobile terminal number) of the mobile terminal 8 that is specified by the orderer (user) contained in order information. The ASP-ID is unique to both of the orderer and every purchase target article (at least one category of purchase target article among the target articles received at the same time).

The ASP-ID management unit 34 judges that the article delivery process to the orderer is completed, this judgement being triggered by a receipt of a home delivery slip number transmitted back from the EC shop 4. The ASP-ID management unit 34 notifies the mobile terminal 8, specified by the orderer, of the ASP-ID generated and an arrival schedule date and time of the purchase target article.

The database (DB) 35 is stored with the order information containing the date, orderer information, article information and shop information of which the orderer and the EC shop 4 notify.

The database management unit 36 manages the information (containing the ASP-ID) on the orderer for a fixed period of time. Further, the database management unit 36 has the following functions.

A first function (1) is to delete the information stored in the database 35 after an expiration period prescribed by law.

A second function (2) is to search the database 35 embracing the databases linked in response to inquiries about a delivery situation, a content of the commercial article, a price etc from the business partners inclusive of the orderer, and sends results thereof back to the communication terminal used by the orderer.

A third function (3) is to receive the article arrival information of which the convenience store notifies in order to notify the orderer of an arrival of the article at the convenience store to which the article is delivered, and to update the database 35.

A fourth function (4) is to receive from the convenience store a notification that a hand-over process of the article to the orderer is completed, then update the database 35 and notify the EC shop 4 of this purport.

A fifth function (5) is to notify the settlement institution 6, such as an orderer's own bank and so on, of the information necessary for paying the price of the article and fees occurred upon the completion of the hand-over of the article.

The database 37 is stored with ever-managed pieces of information on the respective business partners and on the article hand-over place such as the convenience store in the form of a shop list.

The database management unit 38 manages the article hand-over shop list of the convenience store etc and the article delivery process, and has the following functions.

A first function (1) is to periodically update the article hand-over shop list of the convenience store etc.

A second function (2) is to notify the EC shop 4 of an article delivery request containing the orderer information, the article information, the receiving convenience store and so on.

A third function (3) is to input the home delivery slip number to the article delivery request, receive the information sent back from the EC shop 4 and update and manage the database 37. Note that the EC shop 4 pads the home delivery slip number to the article delivery request of which the database management unit 38 notified, and sends it back as an article delivery response.

A fourth function (4) is to repeatedly notify he EC shot 4 of the delivery request a predetermined number of times if the EC shop 4 does not send the article delivery response and judge, if there is no response, that the service is not available. Then, the EC shop 4 concerned is blacklisted. Further, the article orderer is notified of this purport.

According to this computer system 3, the functional units 30 through 38 cooperate to perform the functions described above on the basis of an EC service providing program (process execution program) downloaded into a main storage unit (unillustrated) from the hard disk.

In the computer system 3, the contents stored in the database 35 are generated and formatted per orderer based on the input information given from the orderer. FIG. 3 shows one example of the input information given from the orderer. The orderer inputs necessary items of information through the information terminal 9 when purchasing the article at the EC shop 4.

This set of input information contains a telephone number (MSN) of the specified mobile terminal 8 desiring to have notifications of an ASP-ID and a receivable date and time, a name, an address and a telephone number (of a home fixed telephone terminal as a piece of contact information) of the orderer, a name of the article, the number of articles, an article number and a settlement method (if a credit settlement is selected, a settlement number (bank account number) is inputted, and, in the case of a payment at the convenience store, the "payment" is selected), and a delivery destination (a name and a location of the convenience store are selected).

The EC shop 4 refers to the computer system 3 for the information in order to confirm a receipt of the article and a state of the payment, wherein parameters shown by way of one example in FIG. 4 are used as a key suite. These key parameters when the EC shop refers the information to the computer system 3 are the name of the article, the article number, the name of the orderer, the date of order, the address, the contact information and the home delivery destination (to which the article is delivered).

Figure 5:
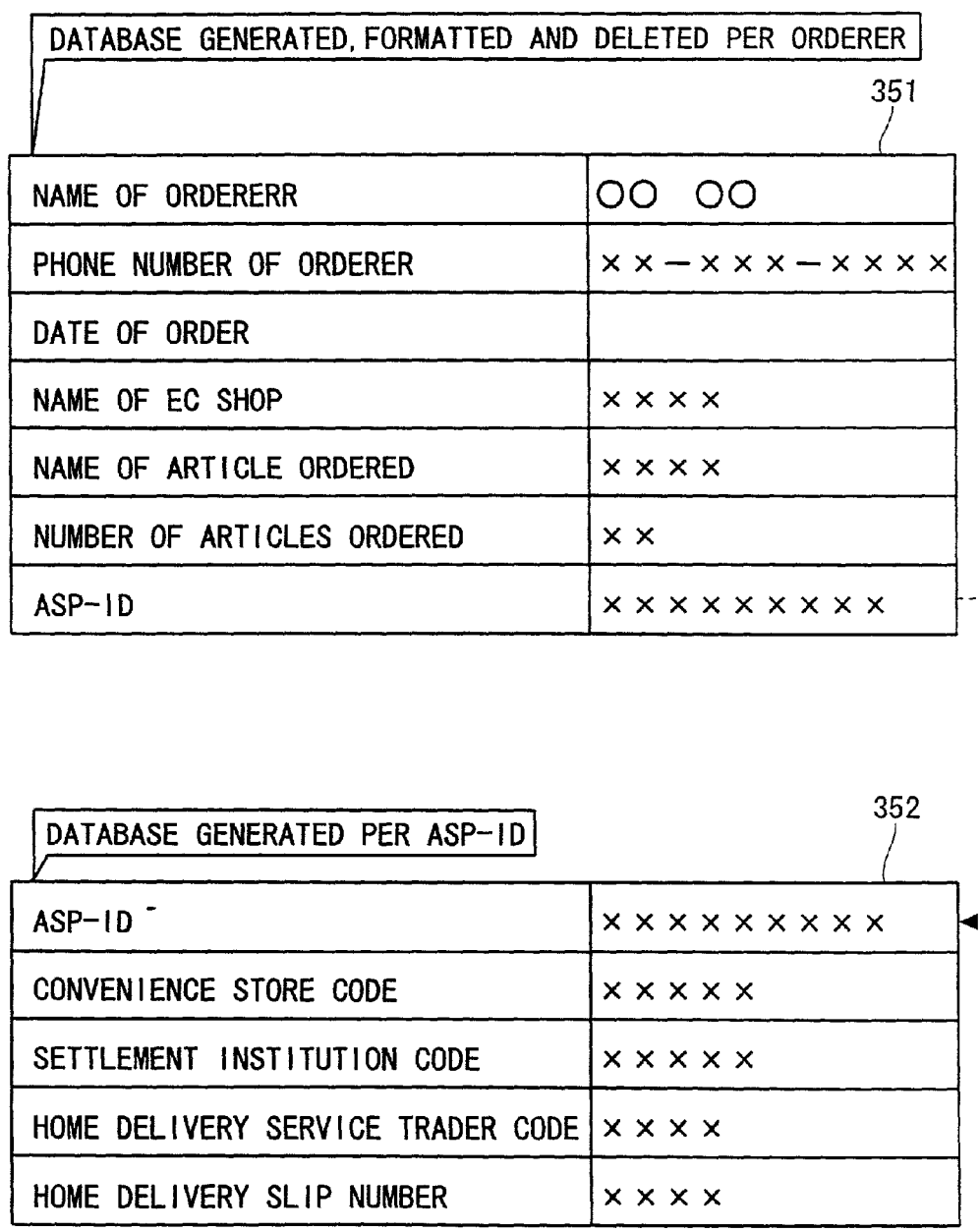
FIG. 5 is a diagram showing an example of a structure of a database.

The computer system 3 includes three types of databases shown in FIGS. 5 and 6.

A first type (1) of database is a database 351 in which the data are generated, formatted and deleted per orderer.

A second type (2) of database is a database 352 in which the data are generated, formatted and deleted per ASP-ID.

A third type (3) of database is a set of databases 371, 372, 373 that are ever-managed by the computer system 3 and provided corresponding to the respective business partners.

Herein, the databases 351, 352 are created in the database 35. Further, the databases 371, 372, 373 are created in the database 37, the databases 351, 352 are day-by-day-managed databases, and their data are sequentially deleted after a cancel effective period has been expired.

The database 351 is stored with the name of the orderer, the telephone number of the orderer, the date of order, the name of the EC shop, the name of the order article, the number of the articles ordered and the ASP-ID. The database 352 is stored with the ASP-ID, a convenience store code, a settlement institution code, a home delivery service trader code and a home delivery slip number. The database 351 is linked through the ASP-ID serving as key information to the database 352.

The databases 371, 372, 373 are databases for storing the delivery destination (convenience store) code, the settlement institution code and the home delivery service trader code. The database 371 is stored with the convenience store code, a name of the convenience store, a location and a telephone number.

The database 372 is stored with the settlement institution code, a name of the settlement institution (name of a bank branch office) and a bank account number. The computer system 3 manages, based on the database 372, the settlement bank information (article price payment institution) of which the EC shop 4 notifies.

Further, the database 373 is stored with the home delivery service trader code and the name of the home deliver service trader. The computer system 3 manages the home delivery service trader coder and the name of the home delivery service trader on the basis of the database 373 in order to respond to an inquiry about an article deliver state.

A program executed by the computer system 3 to execute respective processes according to the present invention, which will be explained later on, is loaded beforehand into the hard disk of a hard disk drive from a CD-ROM or a floppy disk by an unillustrated CD-ROM drive or floppy disk drive.

Further, the interface unit 31 may store this process execution program into the hard disk via the Internet 2. The process execution program is downloaded into the main storage unit (not shown) from the hard disk, and controls the respective units of the computer system 3 to execute the processes according to the present invention.

[Generation of Orderer Authentication Identifier (ASP-ID) in Computer System]

The computer system (ASP) 3 needs to generate, as a unique number, the ASP-ID used for authenticating the orderer. This is because it is a basic rule that the ASP 3 issues one single ASP-ID per orderer and per purchase target article (at least one category of purchase target article among the target articles received at the same time).

The ID used for receiving the article is set absolutely unique no to be duplicated with others, thereby ensuring the receipt of the article by the purchaser himself or herself and enabling the purchaser to confirm the delivery state of the article.

In case the ASO-ID is duplicated, if the identical purchaser consecutively orders the different agency service traders, it is difficult to specify the article to be received, and besides it is, as a matter of fact, impossible to confirm the article delivery state.

Given herein is an explanation of one example of a method by which the ASP-ID generation unit 33 of the ASP 3 generates the ASP-ID. One-way function MD5 (Message Digest 5) widely used among the Hash functions defined as one of encryption technologies, generates a 128-bit Hash value.

What is characteristic of the one-way function is that y can be calculated fast from x in the formula such as $y=f(x)$, however, it is difficult to reversely obtain x from y, and a tremendous quantity of calculation time is needed. Under the using environment of the mobile communication terminals of which the immediateness is demanded, it is of importance in terms of both the immediateness and utility to obtain a random number (Hash value) at a high speed.

A specific example of generating the ASP-ID by use of the one-way function MD5 is explained. The ASP-ID can be, however, generated by use of Internet standard algorithm MD4 defined as a similar one-way function and SHA1 as well. The ASP-ID can be also generated by use of other encryption technologies (e.g., common key/public key cryptographic system, One-Time-Password system and so forth) in combination.

Figure 7:
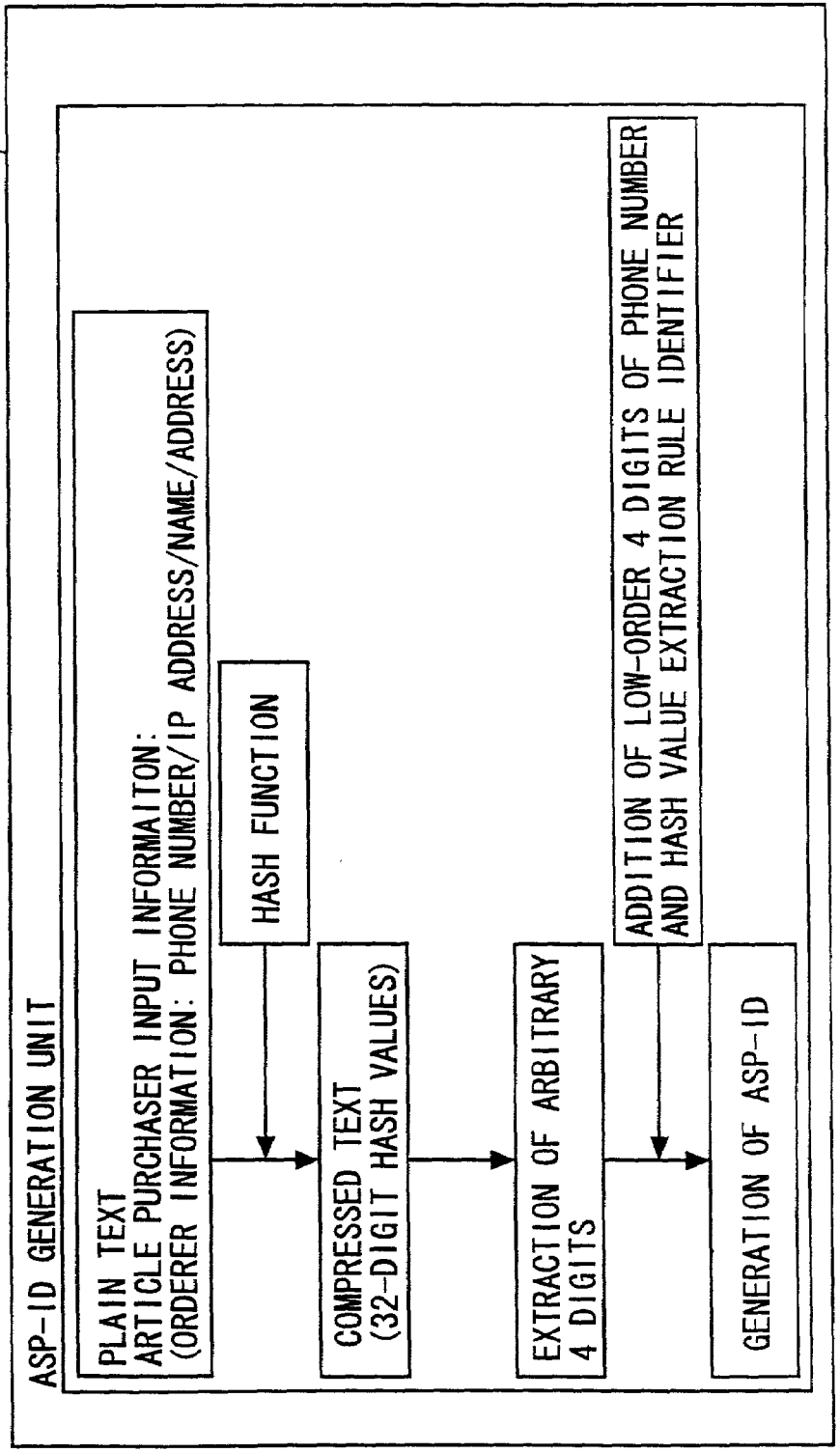
FIG. 7 is an explanatory diagram showing an example of generating an orderer authentication identifier ASP-ID using Hash functions.

FIG. 7 shows an example where the ASP-ID generation unit 33 generates the ASP-ID by use of the Hash function (program).

The ASP-ID generation unit 33 selects proper items of data (e.g., the telephone number of the communication terminal, the name of the orderer, the address and the IP address) from the input information inputted by the article purchaser when giving an order. Then, the ASP-ID generation unit 33 outputs, with these items of data serving as input data (plain text), 32-digit Hash values (compressed text=cipher text).

All these 32-digit Hash values can be used as the ASP-ID, however, this method is not necessarily proper in terms of considering the utility, i.e., how much laborious it is for the article purchaser to exactly memorize or record the ASP-ID and how much laborious it is to input the ASP-ID from the communication terminal when inquiring of the ASP 3 about the article delivery state and so on.

Such being the case, a preferable example for improving the utility of the ASP-ID based on the 32-digit Hash values, is given as follows. The Hash values generated from the telephone number of the communication terminal among the items of orderer input information such as the telephone number of the communication terminal, the name of the orderer, the address and the IP address, are assumed as follows:

Communication Terminal (Mobile Terminal) Telephone Number: 090-XXXX-0400

Hash Values: 95 04 F7 B0 70 3A 1F 5E AB 26 69 76 28 05 2F 4C (hex)

Then, the consecutive 4 digits among the 32-digit Hash values are combined with the low-order 4 digits of the communication terminal telephone number as one item of the orderer input information, thus generating the ASP-ID. To be more specific, the low-order 4 digits of the telephone number is [0400], and [0400] is combined with [B070] among the Hash values, thus generating the ASP-ID such as ASP-ID=0400B070.

Figure 8:
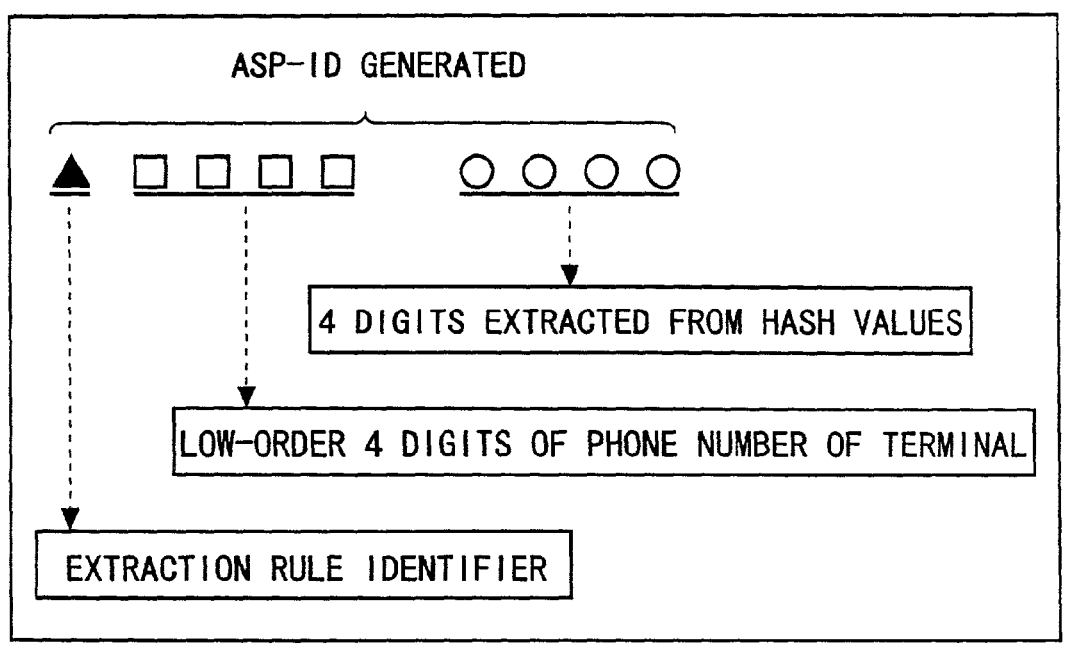
FIG. 8 is an explanatory diagram showing one example of the ASP-ID generated.

Further, an identifier indicating an extraction rule of the Hash values is added to the generated ASP-ID=0400B070 in order to reduce an occurrence of collision of the ASP-ID. Hence, the ASP-ID of which the orderer is notified consists of 9 digits such as [40400B070] as shown in FIGS. 8 and 9.

There is given herein the example in which the consecutive 4 digits among the Hash values are extracted in an arbitrary position, however, the ASP-ID generation unit 33 administers the extraction rule, whereby the ASP-ID can also be actualized by non-consecutive 4 digits.

[Operations of EC Providing System]

Next, a variety of operational examples of the EC providing system 1 in one embodiment of the present invention shown in FIG. 1, will be explained.

Note that the explanations of the in-between architectures of the Internet 2, the mobile communication network 7 and the agency service trader networks 10, 11, 12 are omitted except for their being required to be particularly limited in the following operational examples. What is herein exemplified is the article hand-over operation at the convenience store (POS terminal)13 accommodated in the first agency service trader network 10.

In the EC providing system 1, the computer system (ASP) 3 is connected to the business networks of the enterprises (the convenience store, the home delivery service trader, the settlement institution and the EC shop) related to the EC services, thereby making it possible to conduct the business of controlling and integrating the information needed for a series of commercial transactions in which the orderer as the consumer purchases the article o the Internet 2. Then, the ASP 3 sends the ASP-ID as the orderer authentication identifier that identifies the orderer.

Further, if the ASP 3 provides network-banking services at the same time, a settlement fee occurred between the ASP-network banks can be absolutely eliminated. Further, if both of the EC shop 4 and the orderer have the bank accounts in the same network bank, the settlement fees can be relieved and reduced.

(Flow of Commerce from Purchasing Article to Completion of Receipt of Article)

To start with, a flow of service from purchasing the article up to a completion of receiving the article in the EC service process, will be described with referring to FIGS. 1 through 6 and 10 through 15.

Figure 10:
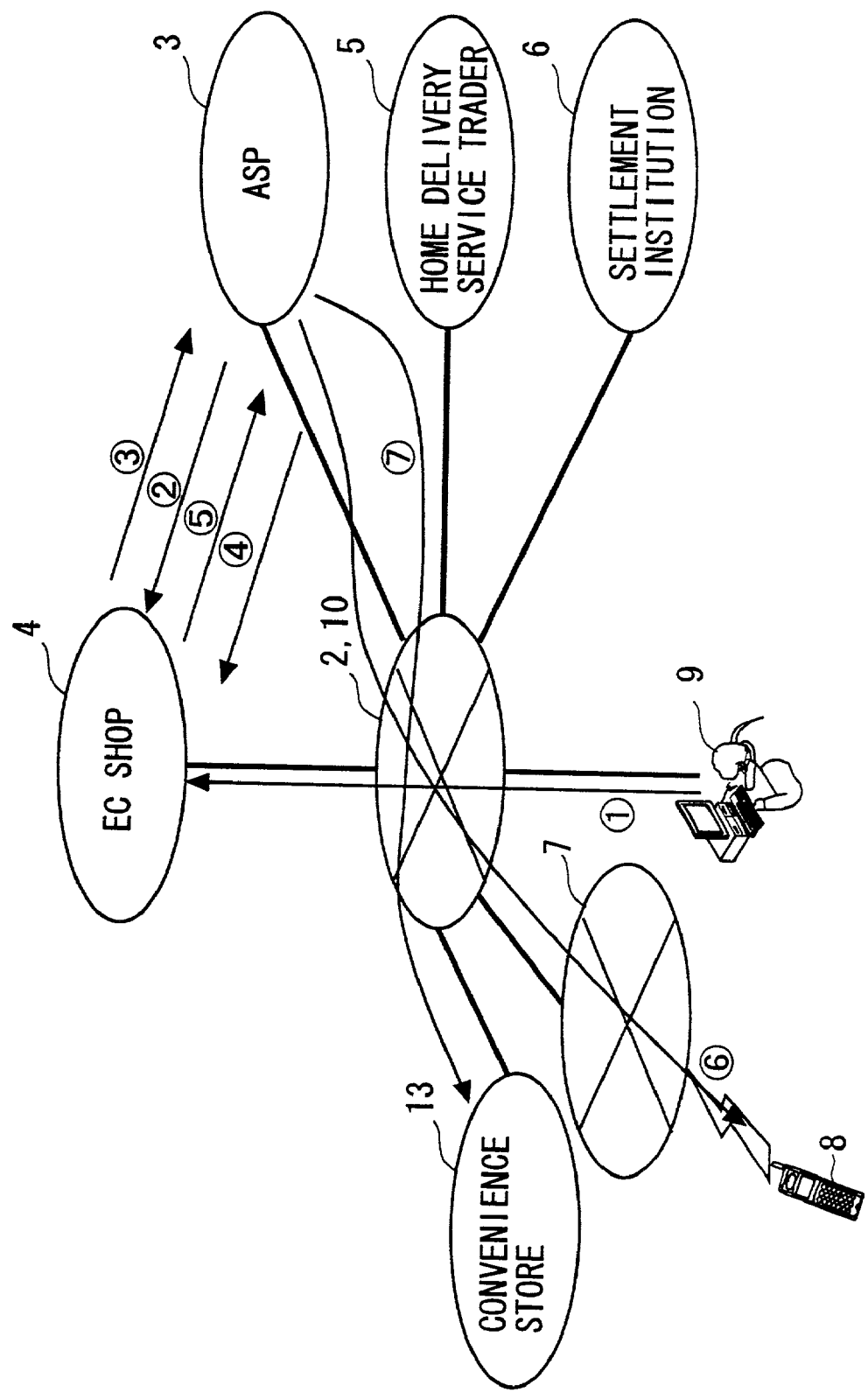
FIG. 10 is a view showing a flow of e-commerce from purchasing the article to notifying of a completion of receipt thereof (from purchasing the article to an arrival of the article at a convenience store)
Figure 11:
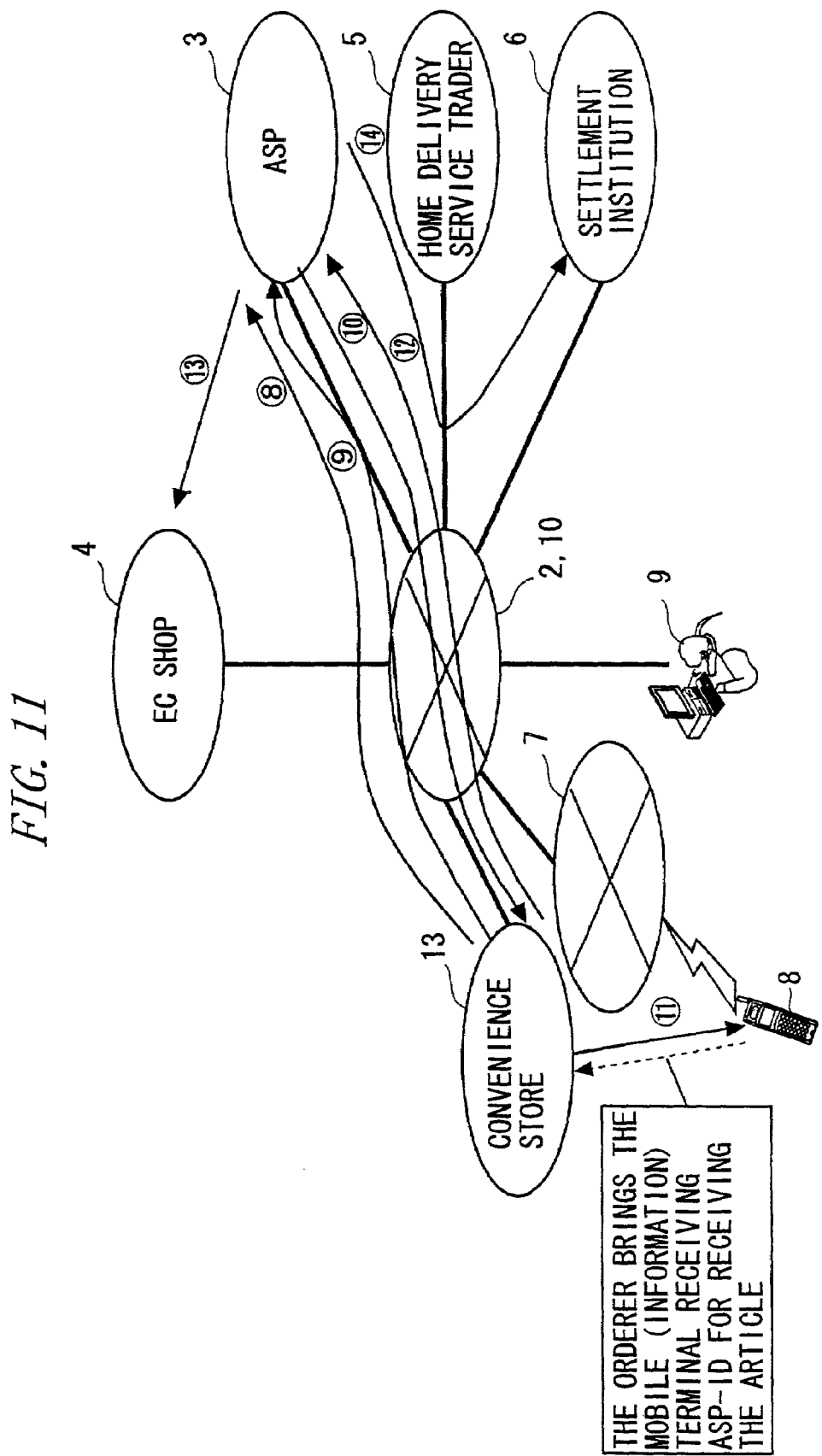
FIG. 11 is a view showing a flow of e-commerce from purchasing the article to notifying of the completion of receipt thereof (from the arrival of the article at the convenience store to the completion of receipt of the article)

FIG. 10 shows a flow of e-commerce from purchasing the article to an arrival of the article at the convenience store in the process starting from buying (ordering) the article up to notifying of the completion of receipt. FIG. 11 show a flow of e-commerce from the arrival of the article at the convenience store to the completion of receiving the article in the process starting from buying the article up to notifying of the completion of receipt.

Figure 12:
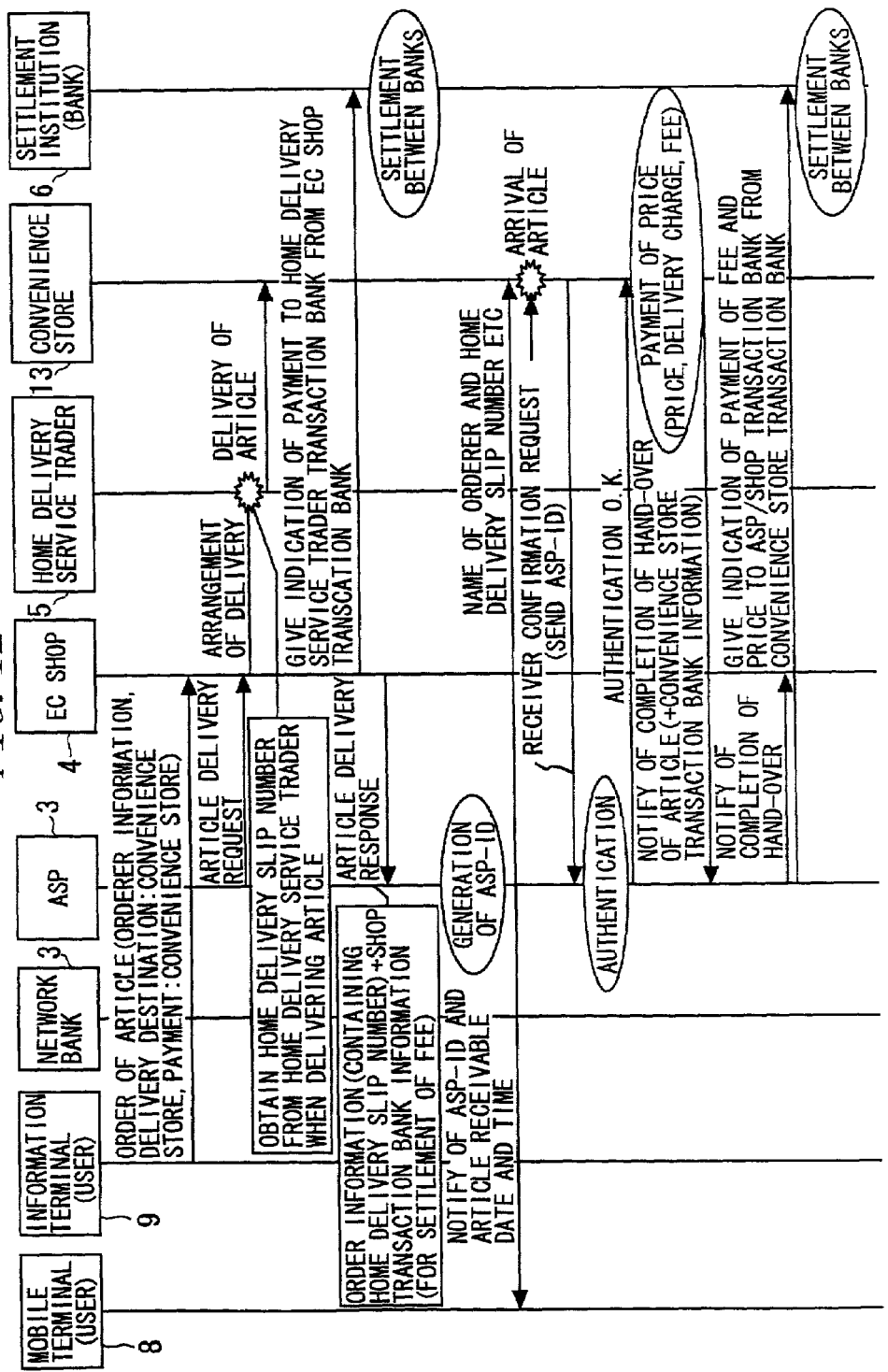
FIG. 12 is a flowchart showing a case where the article orderer receives the article and pays a price thereof at the convenience store.
Figure 13:
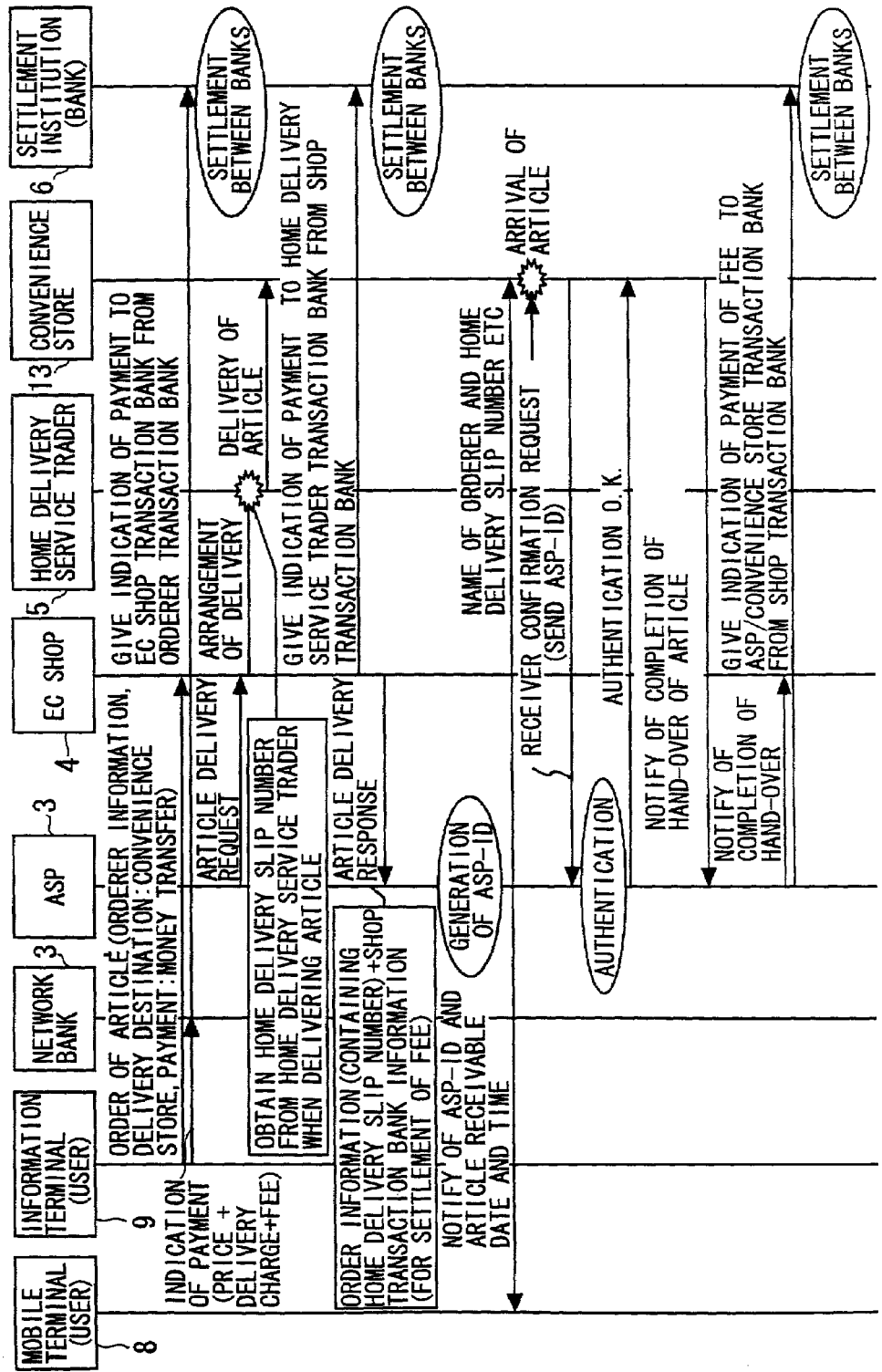
FIG. 13 is a flowchart showing a case where the article orderer makes a payment procedure when giving an order of the article by utilizing an orderer's own network bank.
Figure 14:
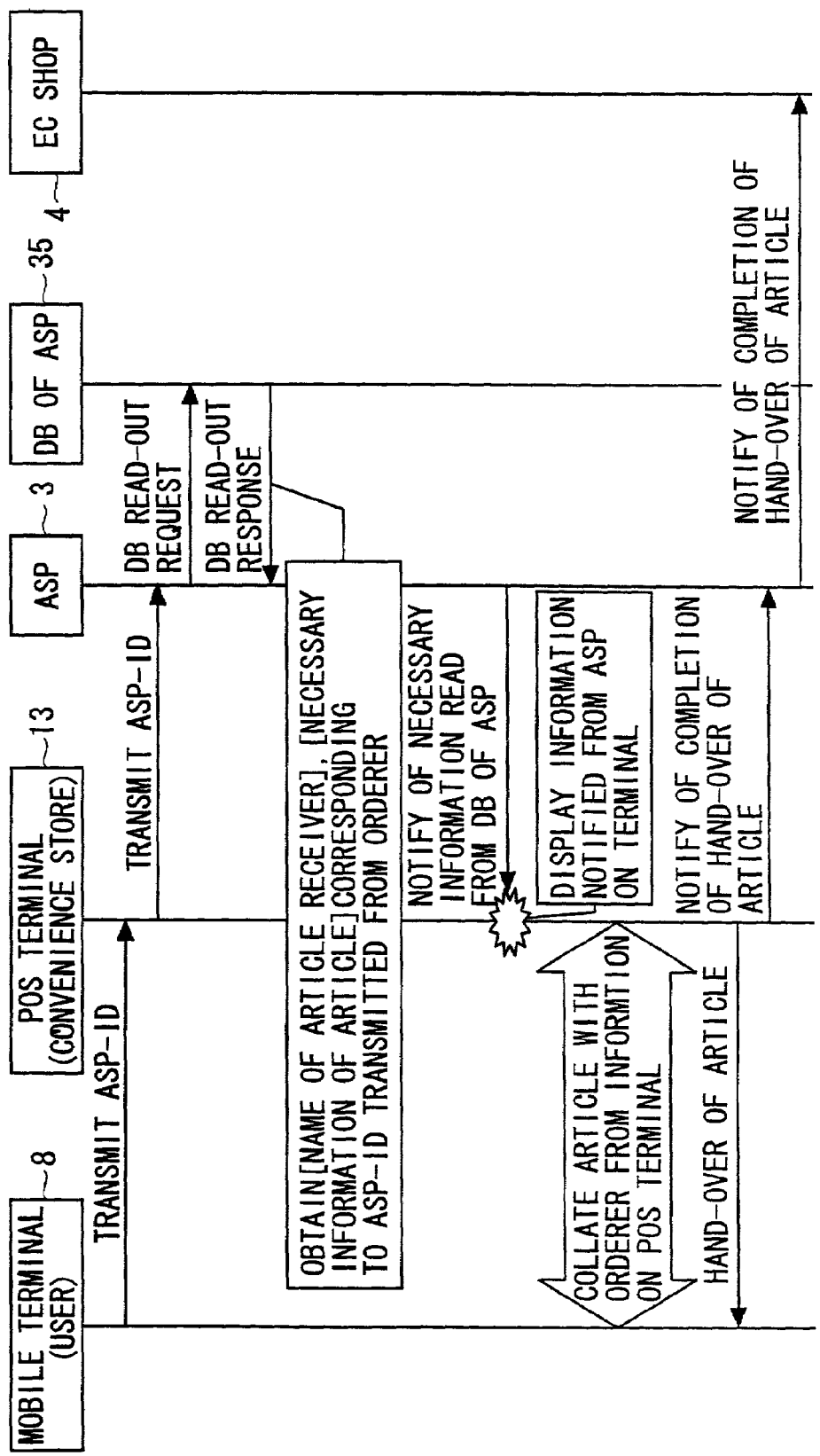
FIG. 14 is a flowchart showing a flow of an identity authentication process when receiving the article.

Further, FIG. 12 shows a flow of e-commerce wherein the article orderer receives the article and pays the price at the convenience store. FIG. 13 shows a flow of e-commerce wherein the article orderer makes a payment procedure at the purchaser's own network bank when giving the order of the article. FIG. 14 shows a flow of a purchaser identity authentication process when receiving the article.

(1) The orderer orders a purchase target article at the EC shop (EC site) 4 on the Internet 2 through the information terminal 9. At this time, the orderer inputs necessary items of order information (input information shown in FIG. 3) based on a predetermined input format displayed on the information terminal 9.

(2) If the orderer specifies the [convenience store] as a article receiving place, the arrangement is that the convenience store list retained by the ASP 3 can be referred to via the EC shop 4. Namely, the EC shop 4 obtains, from the database management unit 38, the convenience store list containing the convenience store codes stored in the database 371 (see FIG. 6) of the ASP 3, and displays the same list on the information terminal 9.

(3) The input information inputted by the orderer on the information terminal 9 is transferred from the EC shop 4 to the ASP 3. The database management unit 36 of the ASP 3 stores the received input information in the database 351 (see FIG. 5).

(4) The ASP 3 (precisely the database management unit 38) notifies the EC shop 4 of the article delivery request.

(5) The EC shop 4 obtains the home delivery slip number from the home delivery service trader 5 when delivering the article and sends it back to the ASP 3. The ASP 3 (the database management units 36, 38) receives this home delivery slip number, and updates and manages the database 352. With this process, the ASP 3 judges that the article delivery is completed.

(6) The ASP 3 (the ASP-ID generation unit 33 and the ASP-ID management unit 34) generates the ASP-ID needed when receiving the article on the basis of the telephone number of the specified mobile terminal 8 that is contained in the input information, and notifies the specified mobile terminal 8 of this ASP-ID by use of a mail function and so forth. In this case, the ASP 3 simultaneously notifies the terminal 8 of an article receivable date and time (such as after X o'clock on X-th day in X-th month)

The ASP 3 generates the ASP-ID needed when receiving the article from the parameters (the telephone number of the specified mobile terminal 8) of the input information, and simultaneously configures the database 352 formatted in linkage to the ASP-ID unique to the orderer that is stored in the database 351. The contents in these databases 351, 352 are retained for a fixed period of time prescribed by law after the completion of receiving the article by the orderer.

Figure 15:
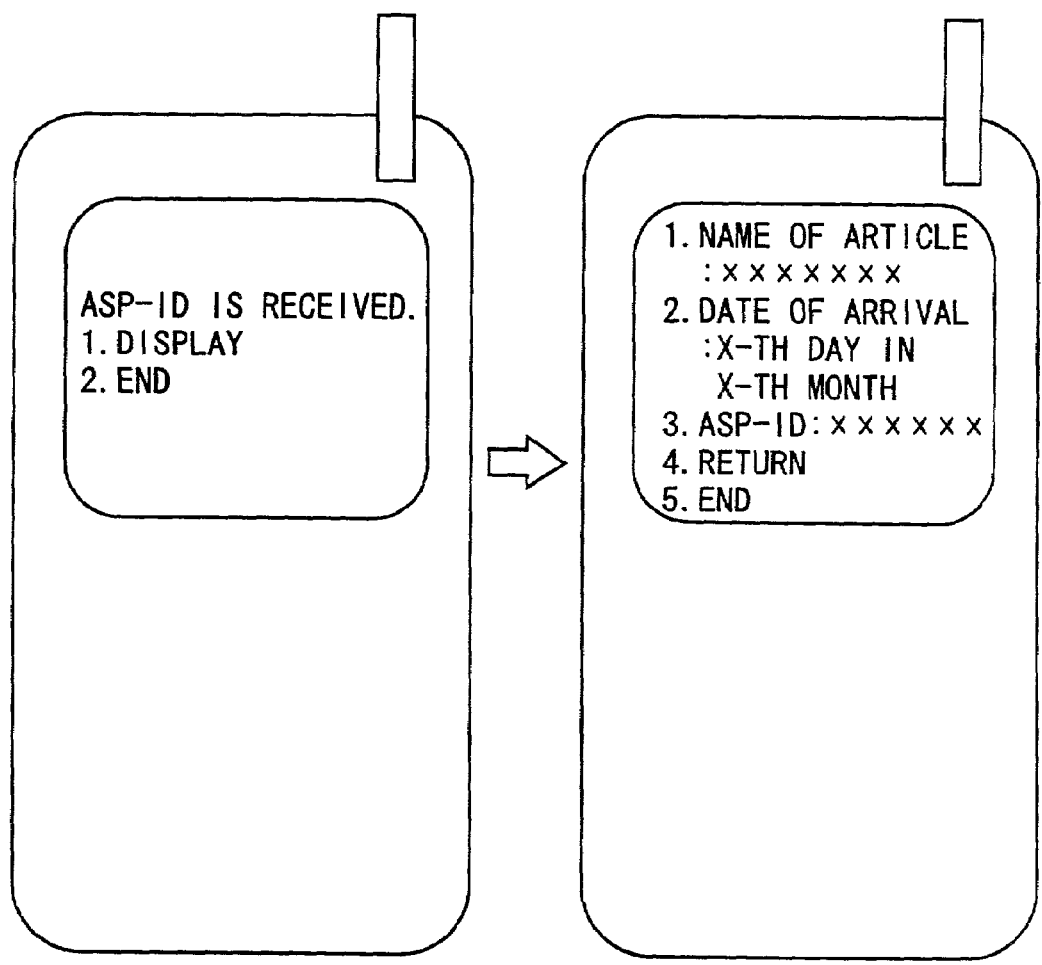
FIG. 15 is a diagram showing a display image of the ASP-ID on a display screen of the mobile terminal.

The ASP-ID and the article receivable date and time of which the ASP 3 notified are, as shown in FIG. 15, displayed on the display of the mobile terminal 8.

(7) The ASP 3 notifies the convenience store 13 as a delivery destination of the information such as the name of the orderer, the name of the article and the home delivery slip number except that the mobile terminal 8 of the orderer is notified of the ASP-ID.

(8) When the article reaches the convenience store 13 as the article delivery destination through the home delivery service trader 5, the convenience store 13 notifies the ASP 3 of a piece of article arrival information.

(9) The orderer brings the mobile terminal 8 having received the ASP-ID to the convenience store 13 where the order is to receive the article, and shows the ASP-ID. After the ASP 3 (the user authentication unit 32) has authenticated the identity, the order can receive the article.

Further, the orderer, even if not bringing the mobile terminal 8, can receive the article by showing the ASP-ID at the convenience store 13. More specifically, the orderer inserts the related-to-the-mobile-terminal-8 contact smart card (UIM, SIM card) or contact-less smart card recorded with the ASP-ID into a slot of the POS terminal or exposes the card to a screen of the POS terminal at the convenience store 13, whereby the orderer is allowed to receive the article.

The convenience store 13, when the orderer brings the mobile terminal 8 thereto, sends the ASP-ID to the POS terminal in a connection mode such as Bluetooth, the infrared-rays and so on, and the ASP-ID is transmitted to the ASP 3 via the POS terminal.

(10) The ASP 3 (the user authentication unit 32 and the database management unit 36) reads necessary items of information such as a name of the article receiver (a name of the orderer), a name of the ordered article etc from the database 351 on the basis of the ASP-ID received. Thereafter, the ASP 3 transmits the same information to the POS terminal at the convenience store 13 and displays the information on the POS terminal.

(11) After confirming the information displayed on the POS terminal at the convenience store 13, the article is handed over to the orderer.

(12) The POS terminal at the convenience store 13 notifies the ASP 3 that the hand-over of the article has been completed.

(13) The ASP 3 (the database management unit 36) notifies the EC shop 4 that the orderer has received the article.

(14) The ASP 3 (the database management unit 36) performs a settlement procedure by a payment method specified by the orderer when giving the order of the article, ad notifies the settlement institution 6 of this procedure as the necessity may arise.

(Variety of Inquiries from Business Partners)

Next, a flow of a variety of inquiries from the business partners down to the completion of receiving the article in the EC service process, will be explained referring to FIGS. 1 through 6 and 16 through 18.

Figure 16:
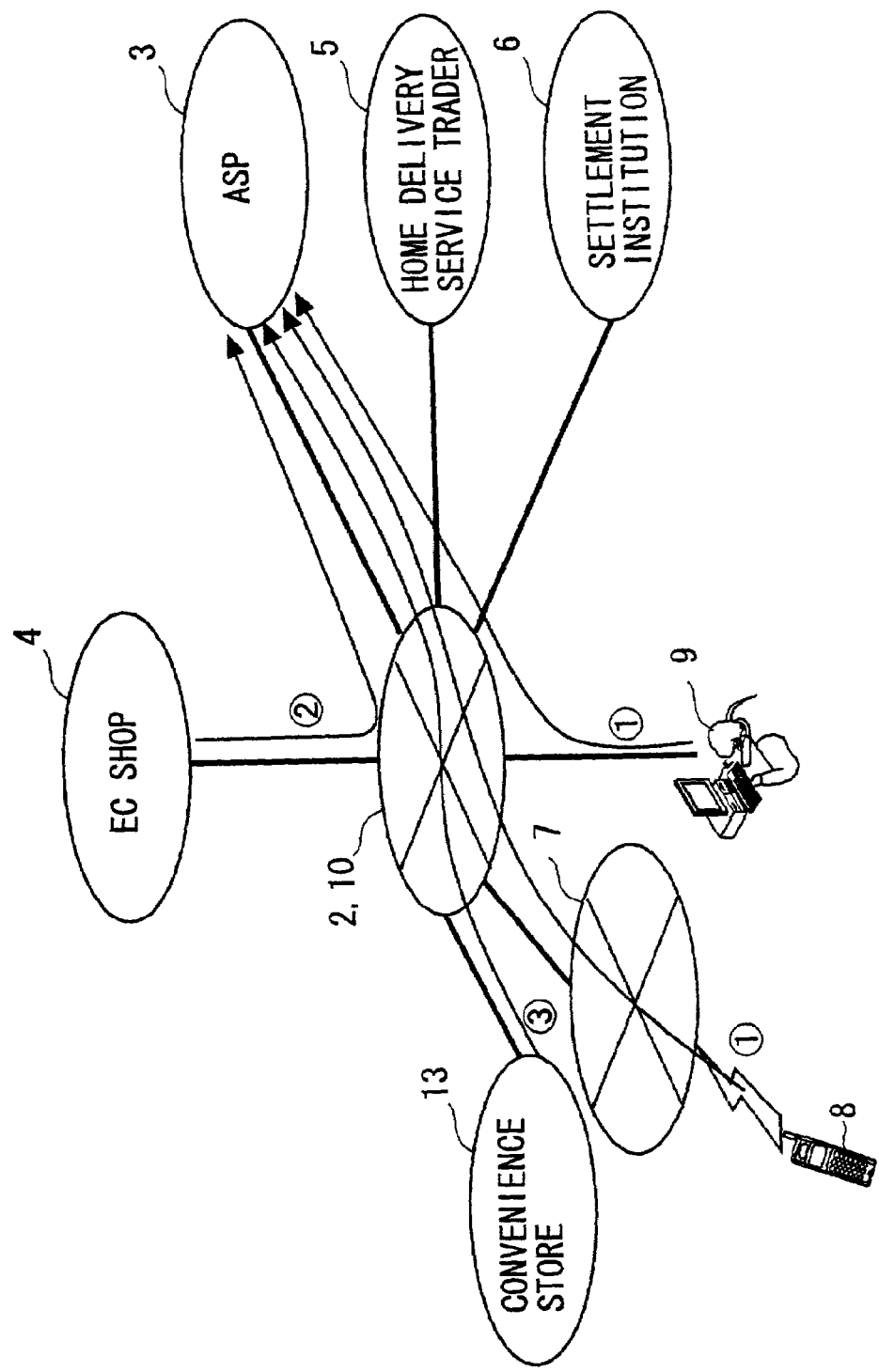
FIG. 16 is a view showing a flow of inquiry from each business partner to the completion of receipt of the article.
Figure 17:
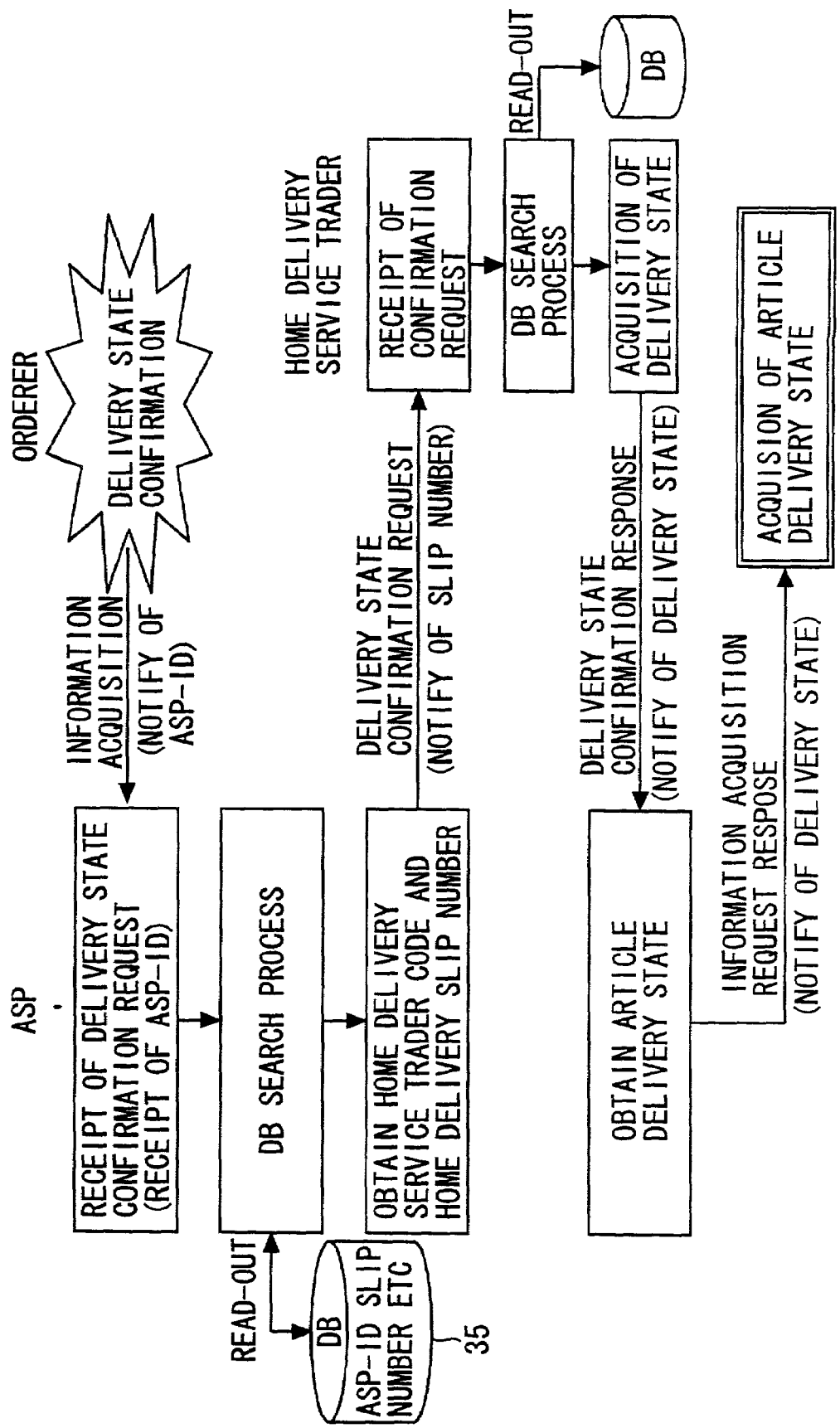
FIG. 17 is a diagram showing an inquiry processing flow when the orderer requests the ASP to confirm a delivery state of the article.

FIG. 16 shows the flow of inquiries from the business partners (including the orderer) during a period to the completion of receiving the article (including an after-receipt cancel by the orderer). FIG. 17 shows an inquiry processing flow when the orderer requests the ASP to confirm the delivery state of the purchase target article. FIG. 18 shows images of menu screens when doing manipulations for confirming the delivery of the article on the mobile terminal.

(1) The orderer makes a variety of inquiries of the ASP 3 through the mobile terminal 8 or the information terminal 9 as a (Web-oriented) terminal connectable to the Internet. To be more specific, the orderer requests, it is assumed, the ASP 3 to confirm the state of delivery of the purchase target article such as whether the article has already been delivered or is on the delivery or not yet delivered, and confirm the settlement date (the payment date at the bank) and the input information (inputted when giving the order of the article).

At this time, the orderer obtains the information from the ASP 3 with the ASP-ID used as a key. Namely, the orderer can refer to the ASP 3 for the information by notifying the ASP 3 of the ASP-ID, and the ASP 3 reads the necessary items of information from the database 35 (351, 352) on the basis of this ASP-ID.

(2) It is also presumed that the EC shop 4 inquires of the ASP 3 about the confirmation of the receipt of the article such as whether the receipt of the article is completed or not yet and about the confirmation of the payment of the article price.

In this case, the EC shop 4 obtains the information, wherein the parameters shown in FIG. 4 are used as keys. The ASP 3 receiving the inquiry from the EC shop 4 inquires of the convenience store 13 and he settlement institution 6.

(3) The convenience store 13, it is presumed, inquires of the ASP 3 about the following matter. That is, the convenience store 13 inquires of the ASP 3 as to a state of receipt if delayed in order to prompt the receipt of the article. At this time, the orderer obtains the information with the home delivery slip number serving as a key. If a request for canceling is given from the orderer, the information is referred to, and the request for the cancel is made. In this case, the orderer obtains the information with the ASP-ID used as a key.

(ASP'S Simultaneous Network-Banking Services)

If the orderer pays the price of the purchase target article in cash at the convenience store, the payment in cash involves a contract needed for the settlement, which must be agreed upon between the convenience store and the EC shop 4. The EC shop 4, if middle- or small-sized, is difficult to make the contract with each of the convenience stores in terms of the guaranty.

The ASP 3 apparently performs an agent function for the contract and provides the network-banking services, which leads to an expansion of the customers (including the general subscribers) of the network banks.

Figure 19:
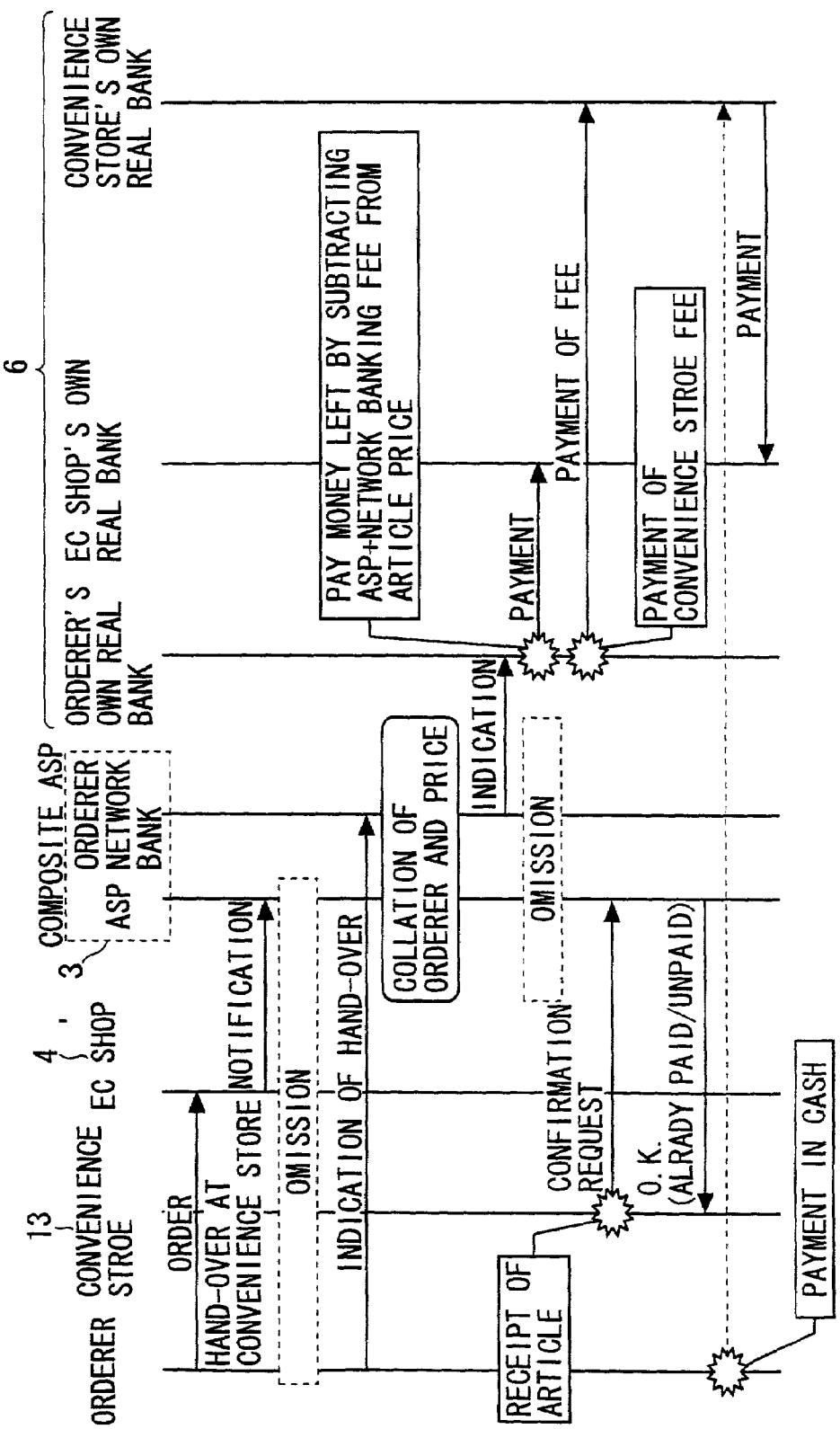
FIG. 19 is a diagram showing a flow of processes up to the receipt of the article when the ASP provides simultaneous network banking services.

When the ASP 3 simultaneously provides the network-banking services, as FIG. 19 clearly shows a flow of the banking services from purchasing the article to the receipt thereof, the business partners have merits described as follows.

A first merit (1) is that it is possible to reduce and relieve a fee for payment/deposit indications to the network bank from the ASP 3.

A second merit (2) is that the fee can be reduced and relieved by establishing a bank account of the network bank administered by the ASP 3, which leads the expansion of the customers of the network bank.

A third merit (3) is that the EC shop 4 establishes the bank account of the network bank administered by the ASP 3 and is therefore capable of restraining a profit rate from decreasing owing to the merit (1).

A fourth merit (4) is that the orderer establishes a bank account of the network bank administered by the ASP 3 pays none of the settlement fees between the network banks owing to the merit (1). Namely, if the orderer's own network bank is different from the network bank administered by the ASP 3, there occurs a fee for settlement between the network banks.

A fifth merit (5) is that if the network banks with which the EC shop 4 and the orderer make the contract are the same (as the network banks administered by the ASP 3), none of the settlement fees occurred therebetween is needed, so that both of the EC shop 4 and the orderer can enjoy this merit.

A sixth merit (6) is that the same merits as those described above are given to the business partners (such as the convenience store and the home delivery service trader) other then the EC shop 4, the orderer and the ASP 3 but related to the present EC services.

(Possible Problems and Troubleshooting thereof in Implementations of EC services)

When implementing the EC services described above, if the purchase target article is not delivered directly to the orderer's home, a possible problem is that a false telephone number of the mobile terminal (of, for example, a disliking person) when making the order of the article might be registered.

The present EC providing system 1 adopts the following method of troubleshooting this possible problem.

(1) The ASP 3 sends a message to the mobile terminal 8 identified by the telephone number inputted when giving the order, and judges from a content of response whether this order is valid or not. Then, the following processes proceed.

Thus, a mistake in inputting the telephone number of the mobile terminal 8 can be detected by authenticating the identity of the orderer when making the order. The ASP 3 notifies the EC shop 4 of a result of the judgement, i.e., whether it is O.K. or not, thereby making it feasible to establish the assured agreement of purchasing the article.

(2) Although based on the premise that the orderer establishes a subscription contract with an Internet service provider (ISP) having a partnership with the ASP 3, the database stored with the contract information (containing names of members, members' numbers and so on) is shared with the ASP 3 as part of a linkage strengthening scheme with, for instance, the Nifty (Service Provider Company) business, whereby the identity of the orderer can be surely confirmed. The orderer can be thereby prevented from registering the false telephone number of the mobile terminal 8.

(3) In the case of tying up with the network bank administered by the ASP 3, the ASP 3 can share the database stored with the contract information for the same reason as that described in the item (2), it is possible to avoid such a possible problem that the orderer might register the false telephone number of the mobile terminal 8.

(Method of Confirming Article Delivery Process between ASP and EC Shop)

As discussed above, in the flow of processing from purchasing the article to the completion of receiving the article, what has been stated in the step (4) is that the ASP 3 notifies the EC shop 4 of the article delivery request.

Further, what has been stated in the step (5) is that the EC shop 4 obtains the home delivery slip number from the home delivery service trader 5 when delivering the article, and sends the same slip number back to the ASP 3, then the database management unit 36 of the ASP 3 receives this home delivery slip number and updates and manages the database 352, and the ASP 3 thereby judges that the delivery of the article is completed.

The EC providing system 1 takes these processing steps and is therefore capable of avoiding risks (that may be troubles such as the article price being taken out by a trick and so on) in the network shopping by the orderer because of the ASP 3 notifying the orderer of the ASP-ID after confirming the completion of the article delivery.

An example of actualizing the linkage between the ASP 3 and the EC shop 4 is that [an HTML (HyperText Markup Language) description of a certain rule] is given to the EC shop 4 (precisely the Web site of the EC shop) for providing a article hand-over function at the convenience store. This implies that this function is not provided if there is made neither the article delivery request from the ASP 3 or the article delivery response thereto.

The following two functions are provided by giving the predetermined HTML description to the EC shop 4.

A first function (1) is that the EC shop 4 is capable of referring to the convenience store list managed by the ASP 3.

A second function (2) is that the EC shop 4 is capable of transferring the content on the order screen, i.e., the order information inputted on the EC site to the ASP 3.

With respect to a mapping of the ASP-ID to the article home delivery slit number, the ASP 3 manages the database 352 stored with the mapping of the ASP-ID to the article home delivery slip number obtained in an article delivery process confirmation flow (see FIG. 22) in cooperation with the EC shop 4. Then, the ASP 3 notifies the orderer's mobile terminal 8 of the ASP-ID.

The ASP 3 is thereby capable of controlling and administering the state of the article delivery per convenience store. In the case of the conventional EC services, it is difficult for the orderer to confirm the delivery state of the purchase target article. It is, however, possible for the orderer to readily confirm the article delivery state by utilizing the ASP-ID.

FIGS. 20 through 23 show details of the article delivery process confirmation method carried out between the ASP 3 and the EC shop 4.

Figure 20:
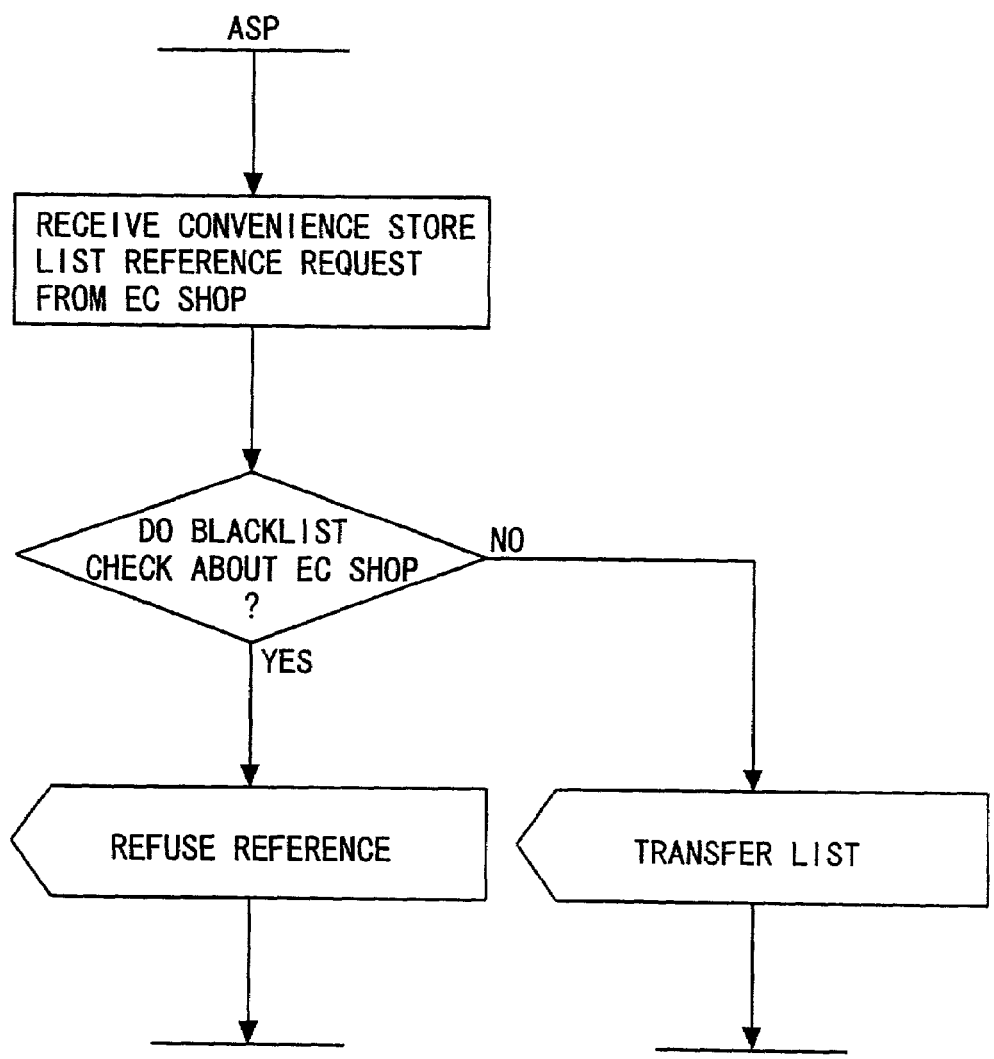
FIG. 20 is a flowchart of processing when the EC shop refers to a convenience store list managed by the ASP.
Figure 21:
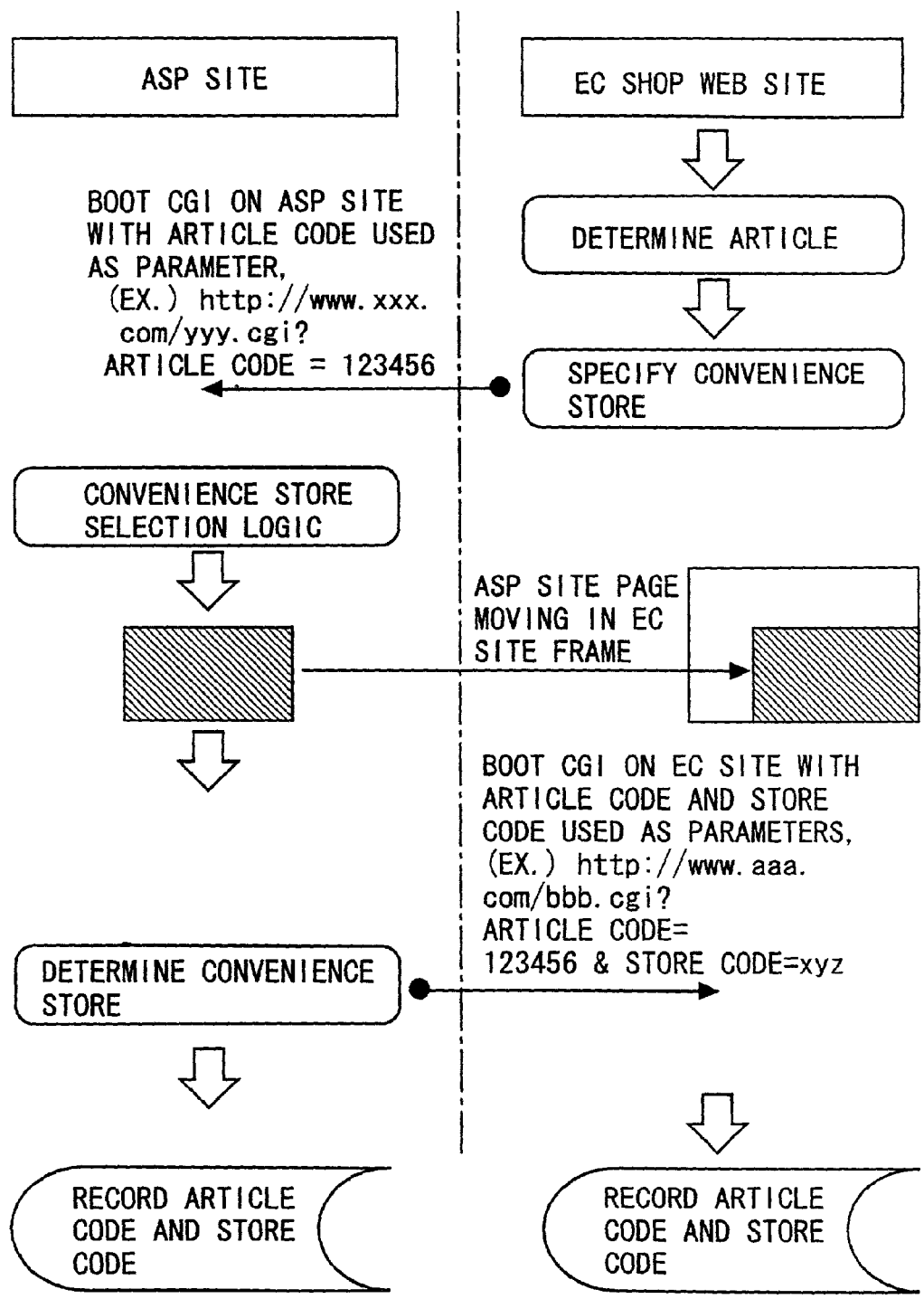
FIG. 21 is a diagram showing a specific processing image when the EC shop refers to a convenience store list managed by the ASP.
Figure 22:
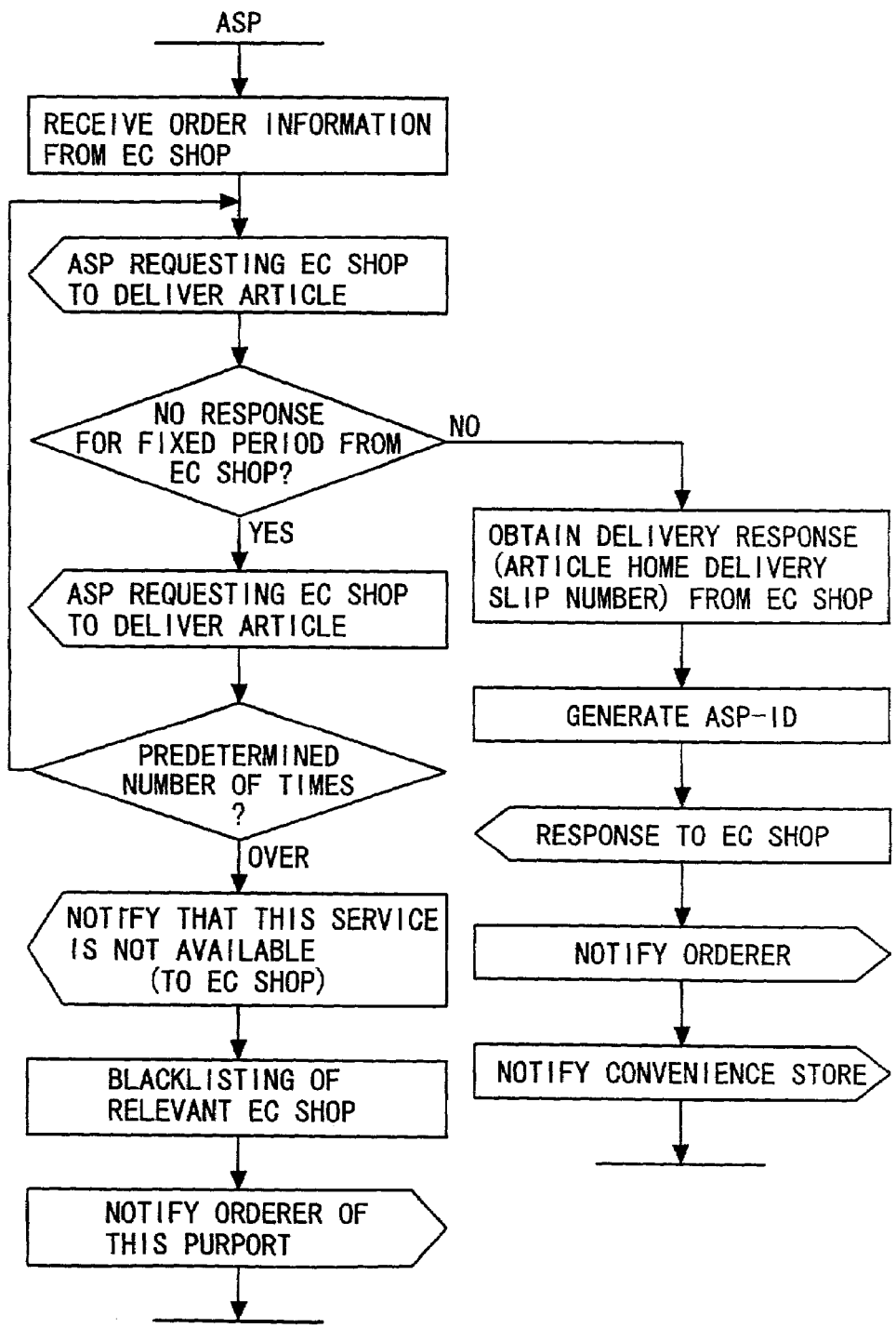
FIG. 22 is a flowchart showing an article delivery request given from the ASP.
Figure 23:
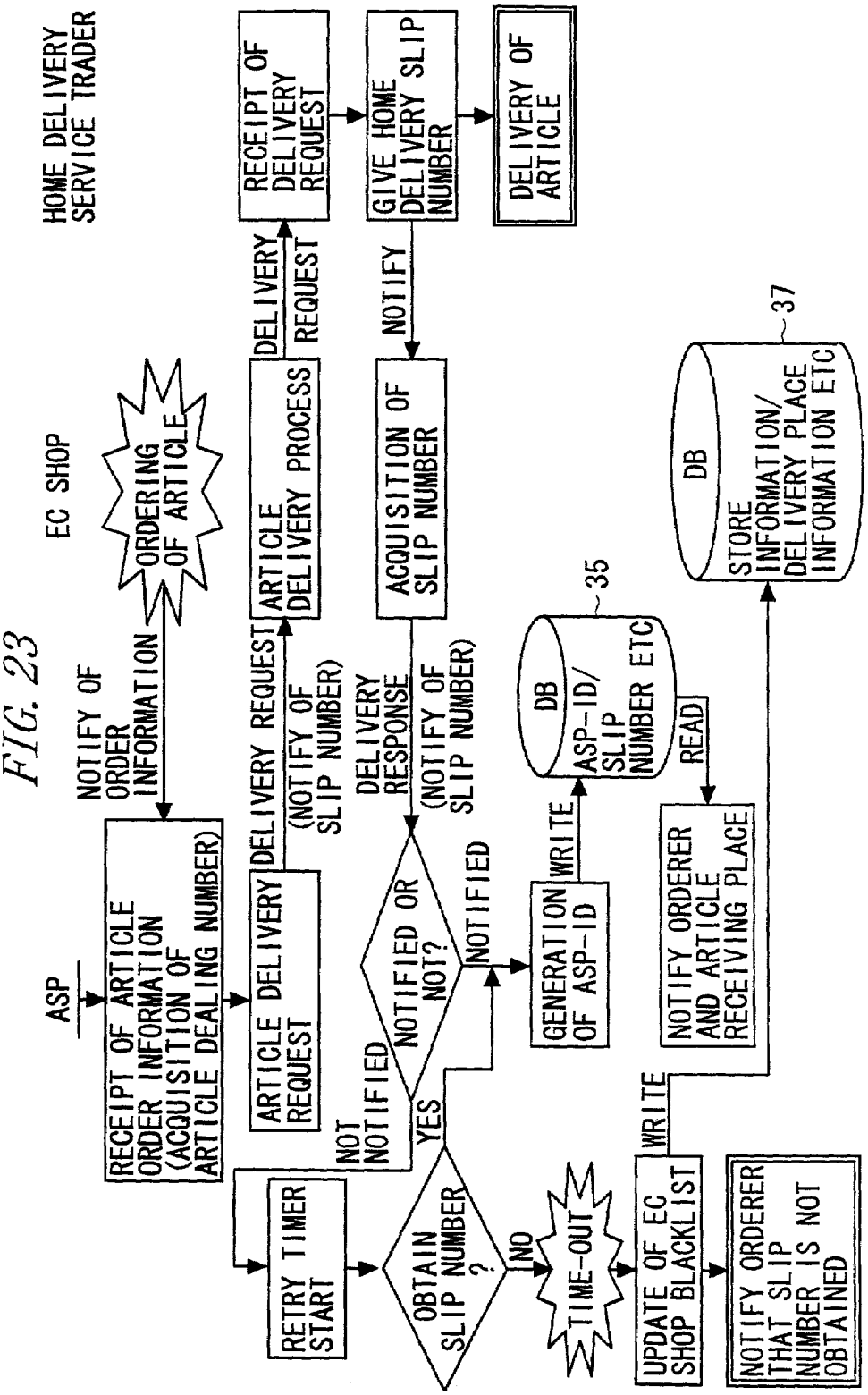
FIG. 23 is a diagram showing a processing flow of linkage between the ASP-ID and an article delivery slip number.

FIG. 20 shows a processing flow when the EC shop 4 refers to the convenience store list in the ASP 3. FIG. 21 shows specific process images when the EC shop 4 refers to the convenience store list managed by the ASP 3. FIG. 22 shows a flow of the article delivery request from the ASP 3. FIG. 23 shows a processing flow of linking between the ASP-ID and the article home delivery slip number.

The article delivery process confirmation method will be described in depth with reference to FIGS. 20 through 23.

(1) When giving the order of the article in FIG. 23 and when the EC shop 4 notifies the ASP 3 of the order information, a CGI (Common Gateway Interface) to the ASP site is booted on the Web site of the EC shop, wherein the ordered article code is used as a parameter. A page on the ASP site can be thereby referred to on a site frame of the EC shop 4.

After determining the convenience store as the article delivery destination, the ASP 3 records the [article codes] and the [delivery destination store codes] which are database-formatted therein. Simultaneously, the same data are recorded and managed also on the EC shop site.

According to this data management system, the same information can be shared simultaneously, and therefore a new processing step for data-sharing is not needed (see FIG. 21).

(2) Referring to FIG. 23, after obtaining the article order information, the processing proceeds to a processing step of delivering the article. The ASP 3 requests the EC shop 4 concerned to deliver the article. The EC shop 4 executes the process of delivering the article concerned, the obtains the home delivery slip number from the hone delivery service trader, and sends a repose to the ASP 3. The ASP 3, after confirming that the article has been surely delivered, generates the ASP-ID.

At this time if the ASP 3 is unable to receive the response containing the home delivery slip number from the EC shop 4 (no repose), the ASP 3 requests the EC shop 4 to deliver the article a predetermined number of times, and, after waiting for time-out (end of retry), this EC shop 4 is blacklisted. This blacklist managed as the database DB 37 of the ASP 3 (see FIG. 22).

(3) The blacklist generated in the process (2) is used from here onward for checking the EC shop 4 each time there is made a request for referring to the article delivery destination (the convenience store) from the EC shop 4.

If this check proves that the EC shop is blacklisted, the ASP 3 executes a process of refusing the reference request from the EC shop 4 (FIG. 20).

A series of these processes are carried out in the process of referring to the convenience store (the article delivery destination) on the ASP site through the CGI from the Web site of the EC shop 4 shown in FIG. 21.

Hence, the orderer is able to avoid the risk on the orderer's own network shopping when specifying the article delivery destination as well as when delivering the article shown in FIG. 22.

The processes on one embodiment discussed above are provided in the form of a program executable by the computer can be recorded on a recording medium such as a CD-ROM, a floppy disk etc and further distributed via a communication line.

Moreover, the respective processes in one embodiment discussed above can be also carried out in a way that selects and combines an arbitrary number of processes or all the processes.

Although only a few embodiments of the present invention have been described in detail above, those skilled in the art will readily appreciate that many modifications are possible in the preferred embodiments without departing from the novel teachings and advantages of this invention. Accordingly, all such modifications are intended to be included within the scope of the present invention as defined by the following claims.

What is claimed is:

1. An electronic commerce server enabling an orderer to give an order to purchase a commercial article at a virtual shop existing on a network by accessing the virtrual shop from a communication terminal used by the orderer, and to receive an article which is a target of a purchase at an agency service trader's place of business other than the home, said server comprising:
    a receiving unit receiving from the virtual shop a piece of order information of the target article and a piece of information for specifying a desired agency service trader's place for receiving the target article, said respective pieces of information from the virtual shop are initiated via said communication terminal used by the orderer;
    an issuing unit issuing a piece of identification information unique to and derived from both the orderer and the target article on the basis of the order information; and
    a confirmation unit confirming, through the agency service trader's place, the identification information received by said communication terminal used by the orderer,
    wherein said issuing unit includes a generation unit generating the identification information unique to and derived from the orderer and the target article from a one-way function on the basis of the order information received from said virtual shop, and said generation unit sets the identification information so as to contain numerals of specified digits of a telephone number corresponding to said communication terminal used by the orderer that is contained in the order information.

2. An electronic commerce server according to claim 1, wherein said confirmation unit confirms the identification information received by said communication terminal used by the orderer through a POS terminal of said agency service trader's place.

3. An electronic commerce server according to claim 2, wherein said confirmation unit confirms the identification information received by said communication terminal used by the orderer through a memory card.

4. An electronic commerce server according to claim 1, further comprising:
    a unit providing said virtual shop with a list of agency service traders' stores capable of supplying the target article to the orderer in order to receive from said virtual shop a piece of information for specifying a desired agency service trader's place for receiving the purchase target article which is selected by the orderer.

5. An electronic commerce server according to claim 1, further comprising:
    a unit notifying said virtual shop of a request for delivering the target article and receiving, from said virtual shop, a delivery slip number as a response to the delivery request of the target article.

6. An electronic commerce server according to claim 5, further comprising:
    a unit notifying of the delivery request a predetermined number of times if the delivery response of the target article is not sent from said virtual shop, registering said virtual shop in a blacklist if there is no delivery response, and notifying said communication terminal used by the orderer of this purport.

7. An electronic commerce server according to claim 5, wherein said issuing unit issues the identification information unique to every orderer and to every target article on the basis of the order information, this issuance being triggered by receiving the delivery response of the target article.

8. An electronic commerce server according to claim 5, further comprising:
    a unit notifying said communication terminal specified by the orderer of the identification information and a receivable date and time for receiving the target article, and notifying the desired agency service trader's place for receiving the target article, of a name of the orderer, a name of the target article and the delivery slip number which are contained in the order information.

9. An electronic commerce server according to claim 1, further comprising:
    a unit erasing the identification information and the order information stored in a database, this erase being triggered by reaching an expiration period prescribed by law.

10. An electronic commerce server according to claim 1, further comprising:
    a unit receiving a piece of completion information when a receipt of the target article is completed from the orderer at the desired agency service trader's place for receiving the purchase target article, notifying said virtual shop of this piece of completion information, and notifying a settlement institution of information on payments of an article price and a necessary fee.

11. An electronic commerce providing method enabling an orderer to give an order to purchase a commercial article at a virtual shop existing on a network by accessing the virtual shop from a communication terminal used by the orderer, and to receive an article which is a target of a purchase at an agency service trader's place of business other than the home, said method comprising:
    receiving from the virtual shop a piece of order information of the target article and a piece of information for specifying a desired agency service trader's place for receiving the target article, said respective pieces of information from the virtual shop are initiated via said communication terminal used by the orderer;

issuing a piece of identification information unique to and derived from both of the orderer and the target article on the basis of the order information; and confirming the identification information, through the agency service trader's place, received by said communication terminal used by the orderer, wherein said issuing involves generating the identification information unique to and derived from the orderer and the target article from a one-way function on the basis of the order information received from said virtual shop, and said generating involves setting the identification information so as to contain numerals of specified digits of a telephone number corresponding to said communication terminal used by the orderer that is contained in the order information.

12. An electronic commerce providing method according to claim 11, wherein said confirming involves confirming the identification information received by said communication terminal used by the orderer through a POS terminal of said agency service trader's place.

13. An electronic commerce providing method according to claim 12, wherein said confirming involves confirming the identification information received by said communication terminal used by the orderer through a memory card.

14. An electronic commerce providing method according to claim 11, further comprising:

providing said virtual shop with a list of agency service traders' stores capable of supplying the target article to the orderer in order to receive from said virtual shop a piece of information for specifying a desired agency service trader's place for receiving the purchase target article of which is selected by the orderer.

15. An electronic commerce providing method according to claim 11, further comprising:

notifying said virtual shop of a request for delivering the target article and receiving from the virtual shop a delivery slip number as a response to the delivery request of the purchase target article.

16. An electronic commerce providing method according to claim 15, further comprising:

notifying of the delivery request a predetermined number of times if the delivery response of the target article is not sent from said virtual shop, registering said virtual shop in a blacklist if there is no delivery response, and notifying said communication terminal used by the orderer of this purport.

17. An electronic commerce providing method according to claim 15, wherein said issuing step involves issuing the identification information unique to every orderer and to every target article on the basis of the order information, this issuance being triggered by receiving the deliver response of the target article.

18. An electronic commerce providing method according to claim 15, further comprising:

notifying said communication terminal specified by the orderer of the identification information and a receivable date and time for receiving the target article, and notifying the desired agency service trader's place for receiving the target article, of a name of the orderer, a name of the purchase target article and the delivery slip number which are contained in the order information.

19. An electronic commerce providing method according to claim 11, further comprising:

erasing the identification information and the order information stored in a database, this erase being triggered by reaching an expiration period prescribed by law.

20. An electronic commerce providing method according to claim 11, further comprising:

receiving a piece of completion information when a receipt of the target article is completed from the orderer at the desired agency service trader's place for receiving the purchase target article, notifying said virtual shop of this piece of completion information, and notifying a settlement institution of information on payments of an article price and a necessary fee.

21. A readable-by-computer recording medium recorded with a program executed by a computer enabling an orderer to give an order to purchase a commercial article at a virtual shop existing on a network by accessing the virtual shop from a communication terminal used by the orderer, and to receive an article which is the target of a purchase at an agency service trader's place of business other than the home, said readable-by-computer recording medium having computer readable instructions causing a computer to execute the steps comprising:

receiving from the virtual shop a piece of order information of the target article and a piece of information for specifying a desired agency service trader's place for receiving the target article, said respective pieces of information from the virtual shop are initiated via said communication terminal used by the orderer;

issuing a piece of identification information unique to and derived from both the orderer and the target article on the basis of the order information; and confirming the identification information, through the agency service trader's place, received by said communication terminal used by the orderer, wherein said issuing involves generating the identification information unique to and derived from, the orderer and the target article from a one-way function on the basis of the order information received from said virtual shop, and said generating involves setting the identification information so as to contain numerals of specified digits of a telephone number corresponding to said communication terminal used by the orderer that is contained in the order information.

22. An electronic commerce server according to claim 1, wherein said orderer may utilize an information terminal to place an order and specify said communication terminal to receive the identification information.

* * * * *

UNITED STATES PATENT AND TRADEMARK OFFICE
CERTIFICATE OF CORRECTION

PATENT NO. : 7,054,835 B2 Page 1 of 1
APPLICATION NO. : 09/989547
DATED : May 30, 2006
INVENTOR(S) : Kazuhiko Nanbu It is certified that error appears in the above-identified patent and that said Letters Patent is hereby corrected as shown below:

Claim 11 column 19, line 6: "-from both of the orderer-" should be changed to -- --from both the orderer-- --.

Claim 17 column 19, line 52: "-said issuing step involves issuing-" should be changed to -- --said issuing involves issuing-- --.

Claim 21 column 20, line 45: "-derived from, the orderer-" should be changed to -- --derived from the orderer-- --.

Signed and Sealed this

Twenty-fourth Day of April, 2007

JON W. DUDAS
*Director of the United States Patent and Trademark Office*